United States Patent
Liu et al.

(10) Patent No.: US 11,924,674 B2
(45) Date of Patent: Mar. 5, 2024

(54) DATA TRANSMISSION METHOD AND APPARATUS

(71) Applicant: Huawei Technologies Co., Ltd., Shenzhen (CN)

(72) Inventors: Hang Liu, Beijing (CN); Mingchao Li, Beijing (CN); Xiao Xiao, Beijing (CN); Hejun Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/988,397

(22) Filed: Aug. 7, 2020

(65) Prior Publication Data

US 2020/0374744 A1 Nov. 26, 2020

Related U.S. Application Data

(63) Continuation of application No. PCT/CN2018/075956, filed on Feb. 9, 2018.

(51) Int. Cl.
*H04W 28/02* (2009.01)
*H04W 4/40* (2018.01)
(Continued)

(52) U.S. Cl.
CPC ........ *H04W 28/0278* (2013.01); *H04W 4/40* (2018.02); *H04W 28/0268* (2013.01); *H04W 76/11* (2018.02); *H04W 92/18* (2013.01)

(58) Field of Classification Search
None
See application file for complete search history.

(56) References Cited

U.S. PATENT DOCUMENTS

| 11,452,000 B2* | 9/2022 | Liu .......................... H04L 1/08 |
| 2003/0103500 A1* | 6/2003 | Menon ............. H04L 12/40058 |
| | | 370/398 |

(Continued)

FOREIGN PATENT DOCUMENTS

| CN | 104954976 A | 9/2015 |
| CN | 105703890 A | 6/2016 |

(Continued)

OTHER PUBLICATIONS

Belleschi. U.S. Appl. No. 62/591,809, filed Nov. 29, 2017 (Year: 2017).*

(Continued)

*Primary Examiner* — Andre Tacdiran
(74) *Attorney, Agent, or Firm* — Leydig, Voit & Mayer, Ltd.

(57) ABSTRACT

This application provides a data transmission method and apparatus. The method includes: obtaining, by a terminal, information used to indicate a first condition; obtaining to-be-transmitted data; and when the first condition is met, sending, by the terminal over a sidelink, the to-be-transmitted data that is on a first logical channel by using a first carrier frequency and the to-be-transmitted data that is on a second logical channel by using a second carrier frequency. In this method, the same data is sent, over the sidelink, on different carrier frequencies by using two logical channels, and a receiving device can receive the same duplicate data, thereby improving data transmission reliability.

10 Claims, 4 Drawing Sheets

(51) Int. Cl.
*H04W 76/11* (2018.01)
*H04W 92/18* (2009.01)

(56) References Cited

U.S. PATENT DOCUMENTS

| | | | |
|---|---|---|---|
| 2010/0215000 A1* | 8/2010 | Dominguez Romero | ................... |
| | | | H04L 47/566 |
| | | | 455/450 |
| 2014/0177585 A1 | 6/2014 | Jang et al. | |
| 2014/0307657 A1 | 10/2014 | Baek et al. | |
| 2015/0003242 A1* | 1/2015 | Han | ........ H04L 47/24 |
| | | | 370/230 |
| 2017/0118671 A1* | 4/2017 | Lee | ........ H04W 72/14 |
| 2019/0150176 A1* | 5/2019 | Pelletier | ............ H04W 72/0453 |
| | | | 370/329 |
| 2019/0158993 A1* | 5/2019 | Kwon | ................... H04L 5/0091 |
| 2020/0084669 A1* | 3/2020 | Belleschi | .......... H04W 72/1263 |
| 2020/0177454 A1* | 6/2020 | Hillis | ...................... H04L 41/12 |
| 2020/0336247 A1* | 10/2020 | Liu | ........ H04L 5/0092 |
| 2020/0367093 A1* | 11/2020 | Belleschi | .......... H04W 28/0278 |
| 2020/0374864 A1* | 11/2020 | Kuang | ................ H04W 72/048 |
| 2021/0127402 A1* | 4/2021 | Lee | ........ H04W 76/27 |
| 2021/0212104 A1* | 7/2021 | Li | ........ H04W 76/16 |
| 2021/0267471 A1* | 9/2021 | Bonomi | ................ A61B 5/1116 |

FOREIGN PATENT DOCUMENTS

| | | | |
|---|---|---|---|
| CN | 107645710 A | | 1/2018 |
| WO | 2014040301 A1 | | 3/2014 |
| WO | WO2015020461 | * | 12/2015 |
| WO | 2017197264 A1 | | 11/2017 |
| WO | 2019108123 A1 | | 6/2019 |
| WO | WO 2019140558 A1 | * | 7/2019 |

OTHER PUBLICATIONS

3GPP TS 36.321 V15.0.0. (Year: 2017).*
3GPP TSG-RAN R2-1805640 (Year: 2018).*
"QoS aspect for V2V," 3GPP TSG-RAN2 Meeting #95, Gothenburg, Sweden, R2-165593, total 4 pages, 3rd Generation Partnership Project, Valbonne, France (Aug. 22-26, 2016).
"QoS Support for V2X transmission," 3GPP TSG-RAN WG2 Meeting #93, Malta, R2-161101, total 5 pages, 3rd Generation Partnership Project, Valbonne, France (Feb. 15-19, 2016).
"QoS enhancements for sidelink and Uu," 3GPP TSG-RAN WG2 #93bis, Dubrovnik, Croatia, Tdoc R2-162817, total 5 Pages, 3rd Generation Partnership Project, Valbonne, France (Apr. 11-15, 2016).
"Reporting PPPP information for LCG-PPPP mapping," 3GPP TSG-RAN WG2 Meeting #92, USA, R2-156761, total 2 pages, 3rd Generation Partnership Project, Valbonne, France (Nov. 16-20, 2015).
"BSR procedure for data duplication," 3GPP TSG-RAN WG2 NR Ad Hoc, Qingdao, China, R2-1706475 Update of R2-1705200, Total 3 pages, 3rd Generation Partnership Project, Valbonne, France (Jun. 27-29, 2017).
"Report from eV2X session," 3GPP TSG-RAN WG2 Meeting #100, Reno, USA, R2-1714119, pp. 1-7, 3rd Generation Partnership Project, Valbonne, France (Nov. 27-Dec. 1, 2017).
"3rd Generation Partnership Project; Technical Specification Group Services and System Aspects; Proximity-based services (ProSe); Stage 2 (Release 15)," 3GPP TS 23.303 V15.0.0, pp. 1-130, 3rd Generation Partnership Project, Valbonne, France (Jun. 2017).
"3rd Generation Partnership Project; Technical Specification Group Radio Access Network; Evolved Universal Terrestrial Radio Access (E-UTRA); Physical layer; Measurements (Release 15)," 3GPP TS 36.214 V15.0.1, pp. 1-23, 3rd Generation Partnership Project, Valbonne, France (Jan. 2018).
"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.0.0, pp. 1-109, 3rd Generation Partnership Project, Valbonne, France (Dec. 2017).
"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.0.1, pp. 1-776, 3rd Generation Partnership Project, Valbonne, France (Jan. 2018).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.0.0, pp. 1-338, 3rd Generation Partnership Project, Valbonne, France (Dec. 2017).
ZTE, "QoS aspects for PC5-based V2V transport," 3GPP TSG-RAN WG2 Meeting #95, Göteborg, Sweden, R2-165279, total 3 pages, 3rd Generation Partnership Project, Valbonne, France (Aug. 22-26, 2016).
Sa2, "Reply LS on Reliability for eV2X," SA WG2 Meeting #125, Gothenburg, Sweden, S2-181368, total 2 pages, 3rd Generation Partnership Project, Valbonne, France (Jan. 22-26, 2018).

* cited by examiner

DATA TRANSMISSION METHOD AND APPARATUS

CROSS-REFERENCE TO RELATED APPLICATIONS

This application is a continuation of International Patent Application No. PCT/CN2018/075956, filed on Feb. 9, 2018, the disclosure of which is hereby incorporated by reference in its entirety.

TECHNICAL FIELD

Embodiments of this application relate to the field of wireless communications technologies, including the field of internet of vehicles technologies, and in particular, to a data transmission method and apparatus.

BACKGROUND

Based on an intra-vehicle network, an inter-vehicle network, and a vehicle-mounted mobile internet, an internet of vehicles system implements vehicle-to-X (V2X) wireless communication and information exchange according to agreed communication protocols and data exchange standards. V2X may be vehicle-to-vehicle (V2V), vehicle-to-network (V2N), vehicle-to-infrastructure (V2I), vehicle-to-pedestrian (V2P), or the like. In other words, X may be a vehicle, a piece of infrastructure, a network, a pedestrian, or the like. The internet of vehicles system aims to improve road safety and traffic efficiency and provide users with a wide range of streaming media services through V2X communication.

Because a cellular technology has advantages such as a short delay, a fast speed, and wide coverage, using the cellular technology to perform V2X communication in the internet of vehicles becomes a current mainstream. As shown in FIG. 1, the cellular technology may be used for V2X communication over a sidelink (also known as a sidelink or the like). To be specific, a resource scheduled or configured by a network device or a preconfigured resource may be used for direct vehicle-to-X communication over the sidelink, and data does not need to be forwarded by the network device.

When a sidelink is used for V2X communication, because a channel characteristic of the sidelink changes rapidly and there is no corresponding feedback mechanism, communication reliability of the sidelink is relatively low. When the sidelink is used for V2X communication, how to ensure reliability of data transmission over the sidelink is an urgent problem to be resolved.

SUMMARY

This application provides a data transmission method and apparatus, to improve reliability of data transmission over a sidelink. This application scenario includes, but is not limited to, a V2X scenario, and may be applied to all scenarios in which communication is performed based on a sidelink, such as a device-to-device application scenario and a machine-to-machine application scenario. Specifically, this application discloses the following technical solutions:

According to a first aspect, this application provides a data transmission method, and the method includes: obtaining, by a terminal, information used to indicate a first condition; obtaining to-be-transmitted data; and when the first condition is met, sending, by the terminal over a sidelink, the to-be-transmitted data that is on a first logical channel by using a first carrier frequency and the to-be-transmitted data that is on a second logical channel by using a second carrier frequency.

With reference to the first aspect, in an implementation of the first aspect, the method further includes: determining, by the terminal, a first carrier frequency set and a second carrier frequency set, wherein the first carrier frequency is a carrier frequency in the first carrier frequency set, the second carrier frequency is a carrier frequency in the second carrier frequency set, there is a correspondence between the first carrier frequency set and the first logical channel, and there is a correspondence between the second carrier frequency set and the second logical channel.

With reference to the first aspect, in another implementation of the first aspect, the determining a first carrier frequency set and a second carrier frequency set includes: obtaining, by the terminal, first information used to indicate the first carrier frequency set and the second carrier frequency set, and determining the first carrier frequency set and the second carrier frequency set based on the first information, wherein the first information is carried in radio resource control RRC signaling or preconfiguration information; or obtaining second information used to indicate a third carrier frequency set, and determining the first carrier frequency set and the second carrier frequency set based on the second information, wherein the second information is carried in RRC signaling or preconfiguration information.

With reference to the first aspect, in still another implementation of the first aspect, the to-be-transmitted data has a data attribute, and the method further includes: obtaining, by the terminal, information used to indicate a fourth carrier frequency set, wherein the fourth carrier frequency set corresponds to the data attribute, and the fourth carrier frequency set includes the first carrier frequency and the second carrier frequency.

With reference to the first aspect, in still another implementation of the first aspect, the data attribute includes one or more of the following: a priority, reliability, a delay, a destination address, and a service type.

With reference to the first aspect, in still another implementation of the first aspect, the information used to indicate the first condition includes a first channel congestion threshold, and the first condition includes: a channel congestion degree on a third carrier frequency is greater than or equal to the first channel congestion threshold; the information used to indicate the first condition includes a second channel congestion threshold, and the first condition includes: a channel congestion degree on a third carrier frequency is less than or equal to the second channel congestion threshold; or the information used to indicate the first condition is a first channel congestion range, and the first condition includes: a channel congestion degree on a third carrier frequency of the terminal falls within the first channel congestion range, wherein the third carrier frequency is one of carrier frequencies that are configured or preconfigured by a network device and that are used for sidelink communication.

With reference to the first aspect, in still another implementation of the first aspect, the third carrier frequency is determined by the network device through configuration or preconfiguration by using the RRC signaling; the third carrier frequency is any one of transmission carrier frequencies of the terminal; the third carrier frequency is a carrier frequency with a minimum channel congestion degree in transmission carrier frequencies of the terminal; the third carrier frequency is a carrier frequency with a maximum channel congestion degree in transmission carrier frequencies of the terminal; the third carrier frequency is any one of carrier frequencies that are in transmission carrier frequencies of the terminal and that support the to-be-transmitted data; the third carrier frequency is a carrier frequency with a minimum channel congestion degree in carrier frequencies that are in transmission carrier frequencies of the terminal and that support the to-be-transmitted data; or the third carrier frequency is a carrier frequency with a maximum channel congestion degree in carrier frequencies that are in transmission carrier frequencies of the terminal and that support the to-be-transmitted data.

With reference to the first aspect, in still another implementation of the first aspect, the information used to indicate the first condition includes a first reliability threshold, and the first condition includes: reliability of the to-be-transmitted data is greater than or equal to the first reliability threshold; the information used to indicate the first condition includes a first enumerated reliability value, and the first condition includes: reliability of the to-be-transmitted data is equal to the first enumerated reliability value; or the information used to indicate the first condition includes a first reliability range, and the first condition includes: reliability of the to-be-transmitted data falls within the first reliability range.

With reference to the first aspect, in still another implementation of the first aspect, the method further includes: determining, by the terminal, the first logical channel and the second logical channel based on a data attribute on each logical channel, wherein the data attribute includes one or more of a priority, a destination address, a delay, a service type, and reliability; or determining, by the terminal, the first logical channel and the second logical channel based on a correspondence between logical channel IDs.

With reference to the first aspect, in still another implementation of the first aspect, the correspondence between logical channel IDs includes: a difference between or a sum of an ID of the second logical channel and an ID of the first logical channel meets a preset value, where the preset value is a positive integer.

With reference to the first aspect, in still another implementation of the first aspect, the method further includes: when a second condition is met, stopping sending, by the terminal over the sidelink, the to-be-transmitted data that is on the first logical channel by using the first carrier frequency and the to-be-transmitted data that is on the second logical channel by using the second carrier frequency.

With reference to the first aspect, in still another implementation of the first aspect, before the stopping sending, by the terminal, the to-be-transmitted data, the method further includes: obtaining, by the terminal, information used to indicate the second condition, wherein the information used to indicate the second condition includes any one of a third channel congestion threshold, a fourth channel congestion threshold, and a second channel congestion range; and the second condition includes: a channel congestion degree on a fourth carrier frequency is greater than or equal to the third channel congestion threshold; a channel congestion degree on a fourth carrier frequency is less than or equal to the fourth channel congestion threshold; or a channel congestion degree on a fourth carrier frequency falls within the second channel congestion range.

The method may be executed by various entities. An execution entity may be not limited to the terminal, and may alternatively be a chip, a chip system, an integrated circuit, or the like.

According to a second aspect, this application further provides a data transmission method, and the method includes: obtaining, by a terminal, configuration information, wherein the configuration information includes reliability information corresponding to a first identifier; obtaining data, wherein reliability of the data is first reliability; and sending a sidelink buffer status report BSR to a network device if the first reliability corresponds to the reliability information, wherein a first data field in the sidelink BSR is the first identifier.

The configuration information further includes the first identifier, for example, a logical channel group identity (LCG ID), and there is a correspondence between the first identifier and the reliability information.

In addition, in a possible implementation, the method further includes: negotiating or agreeing on, by the terminal and the network device in advance, a rule or a rule specified in a protocol. For example, at least one LCG ID is sorted in ascending order. After receiving the configuration information, the terminal determines, according to the rule agreed on with the network device, reliability information corresponding to each of the at least one LCG ID.

With reference to the second aspect, in an implementation of the second aspect, the reliability information includes a second reliability threshold, and that the first reliability corresponds to the reliability information includes: the first reliability is greater than or equal to the second reliability threshold;

the reliability information includes a third reliability threshold, and that the first reliability corresponds to the reliability information includes: the first reliability is less than or equal to the third reliability threshold;

the reliability information includes a second enumerated reliability value, and that the first reliability corresponds to the reliability information includes: the first reliability is equal to the second enumerated reliability value; or the reliability information includes a second reliability range, and that the first reliability corresponds to the reliability information includes: the first reliability falls within the second reliability range.

With reference to the second aspect, in another implementation of the second aspect, the configuration information further includes priority information, and a priority corresponding to the data is a first priority; and the sending a sidelink BSR to a network device if the first reliability corresponds to the reliability information includes: sending the sidelink BSR to the network device if the first reliability corresponds to the reliability information and the first priority corresponds to the priority information.

With reference to the second aspect, in still another implementation of the second aspect, the priority information includes a first priority threshold, and that the first priority corresponds to the priority information includes: the first priority is greater than or equal to the first priority threshold;

the priority information includes a second priority threshold, and that the first priority corresponds to the priority information includes: the first priority is less than or equal to the second priority threshold;

the priority information includes a first enumerated priority value, and that the first priority corresponds to the priority information includes: the first priority is equal to the first enumerated priority value; or the priority information includes a first priority range, and that the first priority corresponds to the priority information includes: the first priority falls within the first priority range.

With reference to the second aspect, in another implementation of the second aspect, the first identifier includes a first logical channel group identity; a first destination address identifier; or a first logical channel group identity and a first destination address identifier.

According to a third aspect, this application further provides a data transmission method, and the method includes: sending, by a network device, configuration information to a terminal, wherein the configuration information includes reliability information corresponding to the first identifier, wherein the configuration information is used to configure the terminal to set a first data field in a sidelink buffer status report BSR sent by the terminal to the network device as the first identifier if reliability of data of the terminal corresponds to the reliability information; and receiving the sidelink BSR from the terminal.

The first identifier includes a first logical channel group identity; a first destination address identifier; or a first logical channel group identity and a first destination address identifier.

With reference to the third aspect, in an implementation of the third aspect, the configuration information further includes priority information, where the configuration information is used to configure the terminal to set the first data field in the sidelink buffer status report BSR sent by the terminal to the network device as the first identifier if the reliability of the data of the terminal corresponds to the reliability information and a priority of the data corresponds to the priority information.

According to a fourth aspect, this application further provides a data transmission apparatus. The apparatus includes units and components configured to perform the method steps in the first aspect to the third aspect and the implementations corresponding to the aspects.

The apparatus may be a terminal, a chip, a chip system, an integrated circuit, or the like.

According to a fifth aspect, this application provides a terminal. The terminal includes the data transmission apparatus according to the fourth aspect, and the terminal includes components such as a processor, a transceiver, and a memory. The processor may execute a program or an instruction stored in the memory, to implement the data transmission method according to the first aspect to the third aspect and various implementations thereof.

The processor is configured to couple to the memory, and read the instruction in the memory. Specifically, the transceiver is configured to: obtain information used to indicate a first condition, and obtain to-be-transmitted data. The processor is configured to: when the first condition is met, send, over a sidelink, the to-be-transmitted data that is on a first logical channel by using a first carrier frequency and the to-be-transmitted data that is on a second logical channel by using a second carrier frequency.

With reference to the fifth aspect, in an implementation of the fifth aspect, the processor is further configured to determine a first carrier frequency set and a second carrier frequency set, wherein the first carrier frequency is a carrier frequency in the first carrier frequency set, the second carrier frequency is a carrier frequency in the second carrier frequency set, there is a correspondence between the first carrier frequency set and the first logical channel, and there is a correspondence between the second carrier frequency set and the second logical channel.

With reference to the fifth aspect, in an implementation of the fifth aspect, the processor is further configured to determine the first carrier frequency set and the second carrier frequency set based on first information or second information, where the first information and the second information are obtained by using the transceiver, the first information is used to indicate the first carrier frequency set and the second carrier frequency set, and the second information is used to indicate a third carrier frequency set. The first information and the second information are carried in RRC signaling or preconfiguration information.

With reference to the fifth aspect, in another implementation of the fifth aspect, the processor is further configured to receive, by using the transceiver, information used to indicate a fourth carrier frequency set, where the fourth carrier frequency set corresponds to a first data attribute, and the fourth carrier frequency set includes the first carrier frequency and the second carrier frequency.

The data attribute includes one or more of the following: a priority, reliability, a delay, a destination address, and a service type.

Optionally, the information used to indicate the first condition includes a first channel congestion threshold, and the first condition includes: a channel congestion degree on a third carrier frequency is greater than or equal to the first channel congestion threshold;
- the information used to indicate the first condition includes a second channel congestion threshold, and the first condition includes: a channel congestion degree on a third carrier frequency is less than or equal to the second channel congestion threshold; or
- the information used to indicate the first condition includes a first channel congestion range, and the first condition includes: a channel congestion degree on a third carrier frequency falls within the first channel congestion range, where
- the third carrier frequency is one of carrier frequencies that are configured or preconfigured by a network device and that are used for sidelink communication.

With reference to the fifth aspect, in still another implementation of the fifth aspect, the third carrier frequency is determined by the network device through configuration or preconfiguration by using RRC signaling;
- the third carrier frequency is any one of transmission carrier frequencies of the terminal; or
- the third carrier frequency is a carrier frequency with a minimum channel congestion degree in transmission carrier frequencies of the terminal;
- the third carrier frequency is a carrier frequency with a maximum channel congestion degree in transmission carrier frequencies of the terminal;
- the third carrier frequency is any one of carrier frequencies that are in transmission carrier frequencies of the terminal and that support the to-be-transmitted data;
- the third carrier frequency is a carrier frequency with a minimum channel congestion degree in carrier frequencies that are in transmission carrier frequencies of the terminal and that support the to-be-transmitted data;
- the third carrier frequency is a carrier frequency with a maximum channel congestion degree in carrier frequencies that are in transmission carrier frequencies of the terminal and that support the to-be-transmitted data; or With reference to the fifth aspect, in still another implementation of the fifth aspect, the information used to indicate the first condition includes a first reliability threshold, and the first condition includes: reliability of the to-be-transmitted data is greater than or equal to the first reliability threshold;

the information used to indicate the first condition includes a first enumerated reliability value, and the first condition includes: reliability of the to-be-transmitted data is equal to the first enumerated reliability value; or the information used to indicate the first condition includes a first reliability range, and the first condition includes: reliability of the to-be-transmitted data falls within the first reliability range.

With reference to the fifth aspect, in still another implementation of the fifth aspect, the processor is further configured to: determine the first logical channel and the second logical channel based on a data attribute on each logical channel, wherein the data attribute includes one or more of a priority, a destination address, a delay, a service type, and reliability; or determine the first logical channel and the second logical channel based on a correspondence between logical channel IDs.

The correspondence includes: a difference between or a sum of an ID of the second logical channel and an ID of the first logical channel meets a preset value.

With reference to the fifth aspect, in still another implementation of the fifth aspect, the transceiver is further configured to: when a second condition is met, stop sending, over the sidelink, the to-be-transmitted data that is on the first logical channel by using the first carrier frequency and the to-be-transmitted data that is on the second logical channel by using the second carrier frequency.

With reference to the fifth aspect, in still another implementation of the fifth aspect, before stopping sending the to-be-transmitted data, the transceiver is further configured to obtain information used to indicate the second condition, wherein the information used to indicate the second condition includes any one of a third channel congestion threshold, a fourth channel congestion threshold, and a second channel congestion range; and the second condition includes: a channel congestion degree on a fourth carrier frequency is greater than or equal to the third channel congestion threshold; a channel congestion degree on a fourth carrier frequency is less than or equal to the fourth channel congestion threshold; or a channel congestion degree on a fourth carrier frequency falls within the second channel congestion range.

According to a sixth aspect, this application further provides a computer storage medium. The computer storage medium may store a program; when the program is executed, some or all of the steps in the embodiments of the data transmission method provided in this application may be implemented.

According to a seventh aspect, this application further provides a network device. The network device includes a transceiver, a processor, and a memory. The processor is configured to: generate information used to indicate a first condition, and control the transceiver to send the information used to indicate the first condition.

With reference to the seventh aspect, in an implementation of the seventh aspect, the information used to indicate the first condition includes a first channel congestion threshold, a second channel congestion threshold, or a first channel congestion range. The first condition includes: a channel congestion degree on a third carrier frequency of a terminal is greater than or equal to the first channel congestion threshold; a channel congestion degree on a third carrier frequency of a terminal is less than or equal to the second channel congestion threshold; or a channel congestion degree on a third carrier frequency of a terminal falls within the first channel congestion range.

With reference to the seventh aspect, in another implementation of the seventh aspect, the information used to indicate the first condition may include a first reliability threshold, a first enumerated reliability value, or a first reliability range, and the first condition includes: reliability of to-be-transmitted data is greater than or equal to the first reliability threshold; reliability of the to-be-transmitted data is equal to the first enumerated reliability value; or reliability of the to-be-transmitted data falls within the first reliability range.

With reference to the seventh aspect, in still another implementation of the seventh aspect, the processor is further configured to: generate information indicating a second condition, and control the transceiver to send the information indicating the second condition.

The information used to indicate the second condition includes any one of a third channel congestion threshold, a fourth channel congestion threshold, and a second channel congestion range. The second condition includes: a channel congestion degree on a fourth carrier frequency is greater than or equal to the third channel congestion threshold; a channel congestion degree on a fourth carrier frequency is less than or equal to the fourth channel congestion threshold; or a channel congestion degree on a fourth carrier frequency falls within the second channel congestion range.

With reference to the seventh aspect, in still another implementation of the seventh aspect, the processor is further configured to send RRC signaling by using the transceiver, where the RRC signaling includes information used to indicate the third carrier frequency. With reference to the seventh aspect, in still another implementation of the seventh aspect, the processor is further configured to send RRC signaling by using the transceiver, where the RRC signaling includes information used to indicate a third carrier frequency set.

With reference to the seventh aspect, in still another implementation of the seventh aspect, the processor is further configured to send RRC signaling by using the transceiver, where the RRC signaling includes information used to indicate a first carrier frequency set and a second carrier frequency set.

With reference to the seventh aspect, in still another implementation of the seventh aspect, the processor is further configured to send RRC signaling by using the transceiver, where the RRC signaling includes information used to indicate a third carrier frequency set.

With reference to the seventh aspect, in still another implementation of the seventh aspect, the processor is further configured to send RRC signaling by using the transceiver, where the RRC signaling includes information used to indicate a fourth carrier frequency set, the fourth carrier frequency set corresponds to a first data attribute, and the fourth carrier frequency set includes a first carrier frequency and a second carrier frequency. The data attribute includes one or more of a priority, reliability, a delay, a destination address, and a service type.

In addition, the memory stores an instruction, and the processor is configured to: read the instruction in the memory, and perform the method in each implementation of the seventh aspect according to the instruction.

According to an eighth aspect, this application further provides a computer program product including an instruction. When the computer program product runs on a computer, the computer is enabled to perform the method steps according to all of the foregoing aspects.

According to the data transmission method provided in the embodiments, when a condition for activating duplicate data transmission is met, the terminal sends, over the sidelink, data that is on the first logical channel and data that is on the second logical channel by using different carrier frequencies, where the first logical channel and the second logical channel include same data from a same PDCP entity. In this way, over the sidelink, the same data is sent on two logical channels by using different carrier frequencies, and a receiving device can receive the duplicate same data, thereby improving data transmission reliability.

DESCRIPTION OF EMBODIMENTS

To enable a person skilled in the art to better understand technical solutions in embodiments of this application, and to make objectives, features, and advantages of the embodiments of this application clearer and more comprehensible, the following further describes the technical solutions in the embodiments of this application in detail with reference to the accompanying drawings.

In the specification, claims, and accompanying drawings of this application, the terms "first", "second", "third", "fourth", and the like (if existent) are intended to distinguish between similar objects but do not necessarily indicate a particular order or sequence. It should be understood that the terms used in such a way are interchangeable in proper circumstances so that the embodiments of the present invention described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Before the technical solutions in the embodiments of this application are described, a technical scenario of the embodiments of this application is first described with reference to the accompanying drawings.

The method provided in the embodiments of this application may be applied to an LTE (Long Term Evolution) system, or a wireless communications system using a wireless access technology such as code division multiple access or orthogonal frequency division multiple access. In addition, the method may be further applicable to subsequent evolved systems of the LTE system, for example, a fifth generation (5G) communications system, an NR (new radio) system, and an internet of things system. The embodiments of this application may be further applied to a WLAN system. This is not limited in the present invention.

The technical solutions provided in the embodiments of this application may be applied to a V2X communications scenario. Specifically, a data transmission method provided in this application includes, but is not limited to, a V2X scenario, and may be applied to all scenarios in which communication is performed based on a sidelink, such as a device-to-device (D2D) application scenario and a machine-to-machine (M2M) application scenario. In all of these application scenarios, the data transmission method provided in this application may be used, and details are not described.

Figure 1:
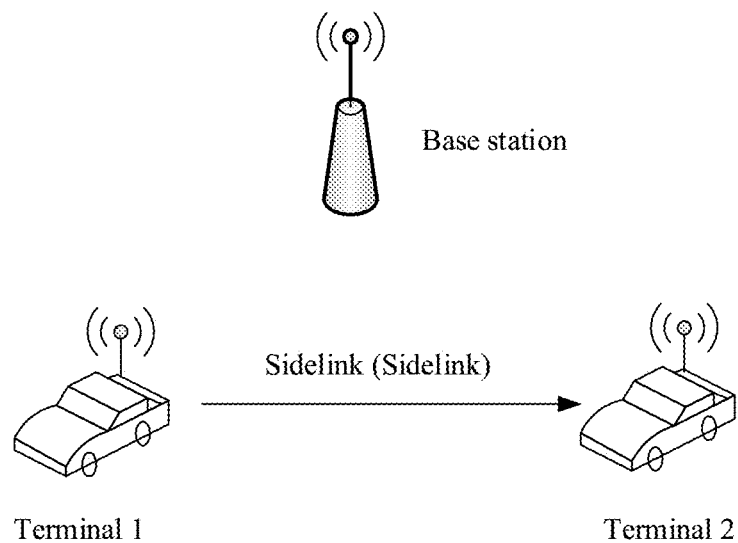
FIG. 1 is a schematic scenario diagram of a sidelink according to this application.

As shown in FIG. 1, a terminal 1 and a terminal 2 communicate with each other through a sidelink, and a communication resource used by the terminals may be scheduled, configured, or preconfigured by a network device.

Specifically, the terminals may use different modes for communication over the sidelink. In one mode, the network device schedules a resource. To be specific, a terminal sends request information to the network device, and the network device dynamically or semi-dynamically schedules a resource for sidelink communication of the vehicle terminal after receiving the request information.

In another mode, a terminal autonomously selects a resource. To be specific, the network device configures a resource set for the terminal by using radio resource control (RRC) signaling, and the terminal autonomously selects a resource from the resource set, for communication. Alternatively, the terminal obtains a resource from a preconfigured resource set, for communication.

The RRC signaling may be a system information block (SIB) message or dedicated radio resource control (dedicated RRC) signaling. The resource set includes several time-frequency resources. Optionally, the resource set may be a resource pool.

The pre-configuration means that the resource set is pre-configured inside the terminal before delivery, or is pre-configured by a network and stored inside the terminal.

In addition, the terminal may randomly select a resource from the resource pool or may select a resource from the resource pool based on a sensing mechanism. This is not limited in this application.

In a wireless communications system environment, an architecture including at least one terminal and a network device shown in FIG. 1 is used, to transmit data over a sidelink.

Further, the terminal may be a terminal device (for example, a vehicle-mounted terminal device or a terminal device carried by a user traveling in a vehicle) in the vehicle in V2X, or may be a terminal device on X (infrastructure, a network, a pedestrian, or the like), or may be a vehicle terminal or X. In addition, the terminal may further include a chip, an integrated circuit, a processor, or the like.

The terminal device in this application may be a wireless terminal. The wireless terminal may be a mobile terminal such as a mobile phone (or referred to as a "cellular" phone) and a computer with a mobile terminal. For example, the mobile terminal may be a portable, pocket-size, handheld, computer built-in or an in-vehicle mobile apparatus, which exchanges voice and/or data with a radio access network.

For example, the terminal device may be a device such as a personal communication service (PCS) phone, a cordless telephone set, a session initiation protocol (SIP) phone, a wireless local loop (WLL) station, or a personal digital assistant (PDA). The terminal may alternatively be a subscriber unit (SU), a subscriber station (SS), a mobile station (MS), a remote station (RS), a remote terminal (RT), an access terminal (AT), a user terminal (UT), a user agent (UA), user apparatus, user equipment (UE), or the like.

Optionally, the network device includes a wireless device. Specifically, the wireless device may be an access point (AP), or may be another network device such as a base station, an enhanced base station, a relay with a scheduling function, or a device with a base station function. The base station may be an evolved NodeB (eNB) in an LTE system or a next generation NodeB (New Radio Node, NR node, gNB) in a future 5G network, or may be a base station in another system. In terms of forms, the base station may be a centralized base station, for example, a cloud radio access network cloud RAN base station, or may be a distributed base station, for example, a conventional GSM base station, or may be a base station with separate control and forwarding, for example, a gNB. This is not limited in the embodiments of this application.

Before the data transmission method provided in this application is described, a communications system protocol stack is first described.

Figure 2:
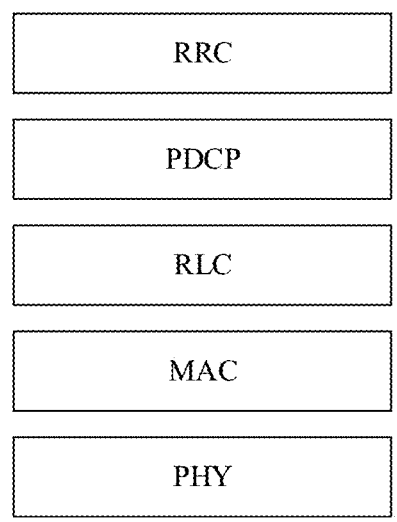
FIG. 2 is a schematic structural diagram of a protocol stack of an LTE system according to this application.

FIG. 2 is a schematic structural diagram of a communications protocol stack of an LTE system. From top to bottom, the protocol stack successively includes an RRC layer, a packet data convergence protocol (PDCP) layer, a radio link control (RLC) layer, a media access control (MAC) layer, and a physical layer (PHY). The PDCP layer is used to process an RRC message on a control plane and data on a user plane. Optionally, on the user plane, after receiving data from an upper layer, the PDCP layer may perform header compression and encryption on the data, and then deliver (submit) the data to the RLC layer.

In addition, optionally, the PDCP layer may further provide an in-order submission function and a duplicate packet detection function for the upper layer. Optionally, on the control plane, the PDCP layer may provide a signaling transmission service for the upper layer RRC, and implement encryption and consistency protection for RRC signaling.

The MAC layer provides data transfer services on logical channels. The logical channels are usually classified into a control channel and a traffic channel. The control channel is used to transmit control plane information, and the traffic channel is used to transmit user plane information. In addition, the MAC layer is further responsible for mapping a logical channel to a transport channel.

The PHY layer is below the MAC layer. The PHY layer is responsible for mapping the transport channel to a physical channel.

The PDCP layer may maintain one or more PDCP entities, and the RLC layer may maintain one or more RLC entities. In the LTE system, when duplicate data transmission is not to be performed, data of a single PDCP entity is delivered to one RLC entity. After duplicate data transmission is activated, the terminal separately delivers, to two logical channels such as a first logical channel and a second logical channel, same data (same to-be-transmitted data of a same PDCP entity) that is at the PDCP layer and that needs to be transmitted. Specifically, the terminal separately delivers, to a first RLC entity and a second RLC entity, the data that is at the PDCP layer and that needs to be transmitted. The first RLC entity corresponds to the first logical channel, and the second RLC entity corresponds to the second logical channel. The correspondence may be implicit or explicit. Then, the MAC layer selects a resource and encapsulates the data. During duplicate data transmission, data on two logical channels on which duplicate data transmission is performed needs to be encapsulated into different transport blocks (TB), and is sent by using different carrier frequencies.

It should be noted that, unless otherwise specified, "duplicate data transmission" or "duplicate transmission" in this application refers to "duplicate transmission of PDCP layer data". In the embodiments of this application, duplicate transmission of PDCP layer data is used as an example. As technologies evolve, the "duplicate transmission of PDCP layer data" may be further extended to a scenario of duplicate transmission of other protocol layer data similar to the duplicate transmission of the PDCP layer data. This is not limited in this application.

In addition, the schematic diagram of the protocol stack in FIG. 2 does not constitute a limitation on a protocol stack to be applied in the future in this application. For example, in a protocol stack structure to be applied in the future, a new layer may be added, a new function may be added, some layers may be deleted, or functions of some layers may be simplified or combined. For example, in a user plane protocol stack, a service data adaptation layer (SDAP) may exist above a PDCP layer.

In addition, the protocol stack may be further classified into a user plane protocol stack and a control plane protocol stack, and the user plane protocol stack may not require an RRC layer.

Figure 3:
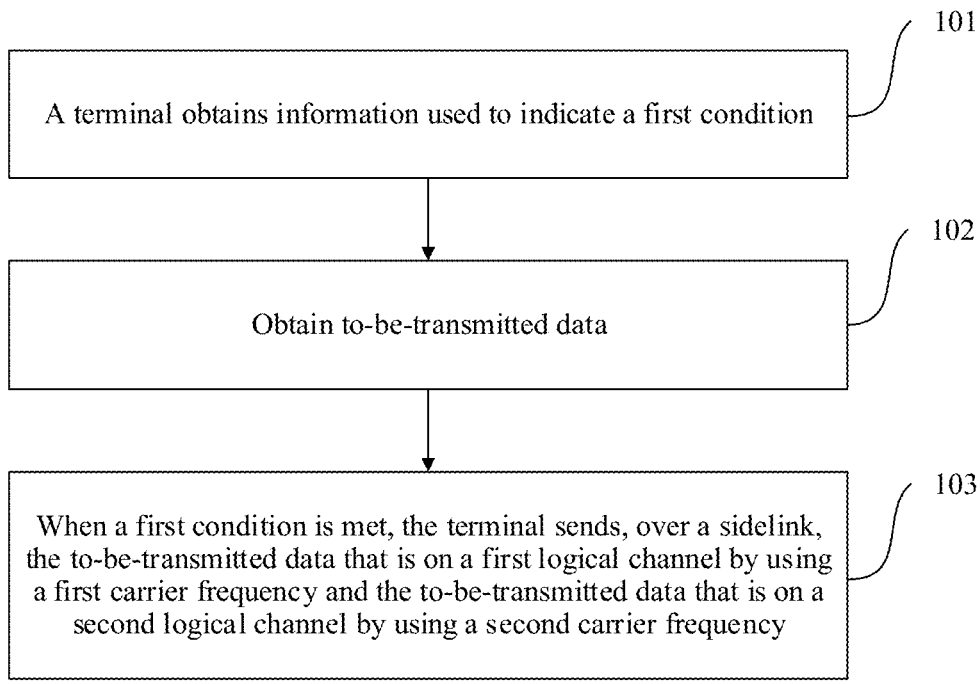
FIG. 3 is a flowchart of a data transmission method according to this application.

FIG. 3 shows a data transmission method according to an embodiment of this application. The method is used to implement duplicate transmission of PDCP layer data on a sidelink, to ensure reliability of data transmission over the sidelink.

The method includes the following steps.

Step 101: A terminal obtains information used to indicate a first condition.

The information used to indicate the first condition may be carried in RRC signaling sent by a network device to the terminal, and the RRC signaling may be a SIB message or dedicated RRC signaling. The terminal obtains, by receiving the RRC signaling, the information used to indicate the first condition.

Alternatively, the information used to indicate the first condition may be carried in a data packet sent by a network device to the terminal device, for example, may be included in a MAC control element ("MAC CE" for short). The terminal obtains, by receiving the data packet, the information used to indicate the first condition.

Alternatively, the information used to indicate the first condition is carried on a physical downlink control channel (PDCCH). The terminal obtains, by obtaining downlink control information (DCI) on the PDCCH, the information used to indicate the first condition.

Alternatively, the information used to indicate the first condition is included in preconfiguration information. The terminal obtains, from the preconfiguration information, the information used to indicate the first condition.

In an optional implementation, the first condition may be an activation condition.

Step 102: The terminal obtains to-be-transmitted data. The to-be-transmitted data is to-be-sent data or a to-be-sent data packet of a PDCP entity.

The terminal may obtain the information indicating the first condition and the to-be-transmitted data at different time points, for example, first obtains the to-be-transmitted data and then obtains the information indicating the first condition. Alternatively, the terminal obtains the information indicating the first condition and the to-be-transmitted data at the same time. A time sequence is not limited in this application.

Step 103: When the first condition is met, the terminal sends, over a sidelink, the to-be-transmitted data that is on a first logical channel by using a first carrier frequency and the to-be-transmitted data that is on a second logical channel by using a second carrier frequency.

The first carrier frequency is different from the second carrier frequency, and the first logical channel and the second logical channel include same to-be-transmitted data, and the to-be-transmitted data is from a same PDCP entity.

In an optional implementation, when the terminal meets the first condition, a PDCP layer of the terminal separately delivers same to-be-sent data to two RLC entities. The two RLC entities are in a one-to-one correspondence with two logical channels (for example, the first logical channel and the second logical channel). Then, the terminal separately sends the data that is on the first logical channel and the second logical channel to a peer device by using two different carrier frequencies. The first logical channel and the second logical channel include same to-be-sent data from a same PDCP entity, to implement duplicate data transmission over a sidelink.

Optionally, that a PDCP layer of the terminal separately delivers same to-be-transmitted data to two RLC entities may be that the PDCP layer of the terminal makes a copy of the same to-be-sent data, and then delivers the two pieces of data to the two RLC entities respectively.

It should be noted that, a time sequence of sending the to-be-transmitted data that is on the first logical channel by using the first carrier frequency and sending the to-be-transmitted data that is on the second logical channel by using the second carrier frequency is not limited in this application. It may be understood that when a resource on the first carrier frequency is available to the terminal, the terminal may send the data that is on the first logical channel by using the first carrier frequency. When a resource on the second carrier frequency is available to the terminal, the terminal may send the data that is on the second logical channel by using the second carrier frequency. The first carrier frequency and the first logical channel are used as an example. Certainly, it may be understood that when a resource on the first carrier frequency is available to the terminal, it is possible that not the entire data on the first logical channel is included for each single sending. A data encapsulation rule for each logical channel (for example, each logical channel for the terminal and a priority of each logical channel) may further needs to be considered. A specific encapsulation rule is not limited in this application.

In addition, based on a quantity of obtained resources and/or an encapsulation rule, a MAC layer of the terminal may perform packet segmentation on data that is on a single logical channel. Therefore, whether to-be-sent data that is on a single logical channel is transmitted in one time or in a plurality of times, that is, whether the data is carried in one TB or a plurality of TBs, is not limited in this application. For example, the to-be-sent data on the first logical channel may be segmented. In this case, the to-be-sent data needs to be transmitted by using a plurality of TBs.

In another optional implementation, before duplicate data transmission is performed, that is, when conventional data transmission is performed, the first carrier frequency may be already available to the terminal, and the terminal transmits the data that is on the first logical channel by using the first carrier frequency. After the first condition is met, the terminal may further add the second logical channel. In this way, the same to-be-transmitted data from the same PDCP entity is delivered to both the first logical channel and the second logical channel. Because the first carrier frequency is already available, the terminal only needs to determine the second carrier frequency, and transmit the data that is on the second logical channel by using the second carrier frequency. The second carrier frequency is different from the first carrier frequency.

The first carrier frequency may be a carrier frequency in a first carrier frequency set, and the second carrier frequency may be a carrier frequency in a second carrier frequency set. There is a correspondence between the first carrier frequency set and the first logical channel, and there is a correspondence between the second carrier frequency set and the second logical channel. To be specific, any carrier frequency in the first carrier frequency set may be used to send the data that is on the first logical channel, and any carrier frequency in the second carrier frequency set may be used to send the data that is on the second logical channel. The first carrier frequency set is orthogonal to the second carrier frequency set. In other words, elements in the first carrier frequency set are different from those in the second carrier frequency set. The correspondence may be implicit or explicit. The first carrier frequency set includes at least one carrier frequency, and the second carrier frequency set includes at least one carrier frequency.

Optionally, before duplicate data transmission is performed, that is, when conventional data transmission is performed, a first carrier frequency set may be already available to the terminal, and the terminal transmits the data that is on the first logical channel by using a first carrier frequency in the first carrier frequency set. After the first condition is met, the terminal may further add a second logical channel. In this way, the same to-be-transmitted data from the same PDCP entity is delivered to both the first logical channel and the second logical channel. Because the first carrier frequency set is already available, the terminal only needs to determine the second carrier frequency set, and transmit the data that is on the second logical channel by using a second carrier frequency in the second carrier frequency set.

In this case, step 103 may further include: determining, by the terminal, the first carrier frequency set and the second carrier frequency set. The first carrier frequency set corresponds to the first logical channel, and the second carrier frequency set corresponds to the second logical channel.

The first carrier frequency set and the second carrier frequency set are determined by the terminal. In addition, the first carrier frequency set corresponds to the first logical channel, and the second carrier frequency set corresponds to the second logical channel. The correspondence may be implicit or explicit. The first carrier frequency set includes at least one carrier frequency, and the second carrier frequency set includes at least one carrier frequency.

In another optional implementation, the terminal obtains information used to indicate a third carrier frequency set, and determines a first carrier frequency set and a second carrier frequency set based on the third carrier frequency set, where the information used to indicate the third carrier frequency set may be carried in RRC signaling or preconfiguration information.

In this application, the information used to indicate the "carrier frequency set" may be at least one carrier frequency identifier. The terminal may determine, by obtaining the at least one carrier frequency identifier, at least one carrier frequency that the at least one carrier frequency identifier points to, to determine the "carrier frequency set". The information used to indicate the "carrier frequency set" may alternatively be a carrier frequency identifier sequence. The terminal determines, by obtaining the carrier frequency identifier sequence, a carrier frequency sequence that the carrier frequency identifier sequence points to, to determine the "carrier frequency set".

For example, the SIB message sent by the base station includes the information used to indicate the third carrier frequency set. The indication may be explicit or implicit. For example, the SIB message directly includes a carrier frequency identifier sequence {CC1, CC2, CC3}, where CC1, CC2, and CC3 are different carrier frequency identifiers. Alternatively, the third carrier frequency set includes a plurality of transmission carrier frequencies that are configured by the base station and that are used for V2X communication, where each transmission carrier frequency may be indicated by using a carrier frequency identifier. The information used to indicate the third carrier frequency set may be at least one carrier frequency identifier. The terminal determines at least one transmission carrier frequency by obtaining the at least one transmission carrier frequency identifier, to obtain the third carrier frequency set.

It should be noted that the first carrier frequency set and the second carrier frequency set are not necessarily the only partitions of the third carrier frequency set. For example, different V2X services may need to be transmitted on different carrier frequencies, but some carrier frequencies in the third carrier frequency set may not support the V2X services. In this case, neither the first carrier frequency set nor the second carrier frequency set includes the carrier frequencies that do not support the V2X services.

That the terminal determines the first carrier frequency set and the second carrier frequency set based on the transmission carrier frequency includes: determining, by the terminal, the first carrier frequency set and the second carrier frequency set based on a to-be-transmitted V2X service and a carrier frequency included in the third carrier frequency set.

In another optional implementation, the terminal determines a first carrier frequency set and a second carrier frequency set based on the RRC signaling received from the network device, where the RRC signaling includes information used to indicate the first carrier frequency set and the second carrier frequency set. For example, the RRC signaling sent by the network device may include a first carrier frequency identifier sequence and a second carrier frequency identifier sequence. The terminal obtains the first carrier frequency set and the second carrier frequency set by using the RRC signaling. The terminal establishes a correspondence between the first carrier frequency set and the first logical channel, and establishes a correspondence between the second carrier frequency set and the second logical channel.

In still another implementation, the RRC signaling sent by the network device further includes a logical channel identifier. For example, the RRC signaling includes a logical channel identifier 1, information used to indicate a first carrier frequency set, a logical channel identifier 2, information used to indicate a second carrier frequency set, and the like. Information used to indicate a carrier frequency set may be at least one carrier frequency identifier, and is used to indicate a corresponding carrier frequency. Further, the logical channel identifier 1 may point to the first logical channel, and the logical channel identifier 2 may point to the second logical channel.

In addition, the carrier frequency may also be referred to as a carrier or a carrier frequency, and may be a radio wave of a specific frequency in a unit of Hz (Hz), for example, 2.5 GHz or 3 GHz. In wireless communication, a carrier frequency or a carrier is usually used to transmit information. Digital signals are modulated onto a high-frequency carrier and then are transmitted and received in the air. It may be understood that performing transmission by using a carrier frequency means transmitting data by using a time-frequency resource on the carrier frequency.

The following describes in detail the first condition and the information used to indicate the first condition in the method.

In step 101, the information used to indicate the first condition includes one or more of channel congestion information and reliability information. In step 103, the first condition includes one or more of a congestion condition and a reliability condition.

If the information indicating the first condition includes the channel congestion information and the reliability information, or includes the congestion condition and the reliability condition, a condition for activating the duplicate transmission of the PDCP layer data needs to meet both a channel congestion determining condition and a reliability determining condition. In this embodiment, the following separately describes in detail an activation condition used when the information used to indicate the first condition is the channel congestion information or the reliability information. When the information about the first condition is the channel congestion information and the reliability information, for the activation condition, refer to a description of the activation conditions used when the information about the first condition is the channel congestion information and a description of the activation condition used when the information about the first condition is the reliability information in this embodiment.

During specific implementation, the first condition may be an activation condition, and the information used to indicate the first condition may be information used to indicate the activation condition.

Further, the channel congestion information includes any one of a first channel congestion threshold, a second channel congestion threshold, and a first channel congestion range.

The first condition includes any one of the following:
a channel congestion degree on a third carrier frequency is greater than or equal to the first channel congestion threshold;
a channel congestion degree on a third carrier frequency is less than or equal to the second channel congestion threshold; or
a channel congestion degree on a third carrier frequency falls within the first channel congestion range, where the third carrier frequency is one of carrier frequencies that are configured or preconfigured by the network device and that are used for sidelink communication.

Optionally, the third carrier frequency may be configured or preconfigured by the base station by using RRC signaling; the third carrier frequency may be any one of transmission carrier frequencies of the terminal; the third carrier frequency may be a transmission carrier frequency with a minimum channel congestion degree in transmission carrier frequencies of the terminal; the third carrier frequency may be a transmission carrier frequency with a maximum channel congestion degree in transmission carrier frequencies of the terminal; the third carrier frequency may be any one of transmission carrier frequencies that are in transmission carrier frequencies of the terminal and that support the to-be-transmitted data; the third carrier frequency may be a carrier frequency with a minimum channel congestion degree in carrier frequencies that are in transmission carrier frequencies of the terminal and that support the to-be-transmitted data; or the third carrier frequency may be a carrier frequency with a maximum channel congestion degree in carrier frequencies that are in transmission carrier frequencies of the terminal and that support the to-be-transmitted data.

The transmission carrier frequencies of the terminal are carrier frequencies currently used by the terminal to perform sidelink data transmission or communication.

In addition, in this application, the third carrier frequency may be the same as or different from the first carrier frequency or the second carrier frequency.

In this application, the channel congestion information may be not limited to an identifier, an index, or other information used to point to or indicate the channel congestion information. That the channel congestion information is the first channel congestion threshold is used as an example. The first channel congestion threshold may point to a first reliability threshold by using an identifier, an index, or the first channel congestion threshold itself.

The channel congestion degree indicates a load status of a channel. For example, the channel congestion degree may be a channel busy ratio (CBR) defined in section 5.1.30 of 3rd generation partnership project TS 36.214 V15.0.1. A heavier channel load indicates a higher channel congestion degree. A channel congestion degree corresponding to a carrier frequency or a channel congestion degree on a carrier frequency is a channel congestion degree in a time-frequency resource set on the carrier frequency. Specifically, the time-frequency resource set may be a resource pool. For example, a channel congestion degree corresponding to a carrier frequency A is a channel congestion degree in a first resource pool on the carrier frequency A, and a channel congestion degree corresponding to a carrier frequency B is a channel congestion degree in a second resource pool on the carrier frequency B.

In addition, the channel congestion degree may be obtained by the terminal through measurement, or may be notified by the network device to the terminal by using RRC signaling.

Example 1

The base station sends RRC signaling to the terminal, where the RRC signaling includes a first channel congestion threshold of 0.5, the first condition is an activation condition, and the channel congestion degree on the third carrier frequency is greater than or equal to the first channel congestion threshold. The terminal is using carrier frequencies {CC1, CC2, CC3} to perform sidelink data transmission. That is, transmission carrier frequencies of the terminal are {CC1, CC2, CC3}, where channel congestion degrees corresponding to the transmission carrier frequencies are respectively {0.2, 0.6, 0.3}. In addition, if the third carrier frequency is a carrier frequency with a maximum channel congestion degree in the transmission carrier frequencies, the third carrier frequency is CC2.

Because the channel congestion degree 0.6 corresponding to the third carrier frequency is greater than the first channel congestion threshold 0.5, duplicate data transmission is activated in this case. The terminal delivers the same to-be-sent data at the PDCP layer to the first logical channel and the second logical channel, sends the data that is on the first logical channel by using the first carrier frequency, and sends the data that is on the second logical channel by using the second carrier frequency.

For example, in V2X communication, when delivering data to an access stratum, an upper layer (above the access stratum) delivers, to the access stratum by using primitives, a data attribute or an identifier corresponding to the data. The data attribute or the identifier may include at least one of a priority, reliability, a delay, a destination address, a service type, and the like. The data delivered by the upper layer to the access stratum may be a data packet. The data attribute or the identifier may alternatively be obtained in another manner. This is not limited in the present invention.

Different data corresponds to different priorities. At the access stratum, different parameters are usually configured for different data priorities, to perform differentiated processing.

The terminal may have a plurality of different types of services. The different types of services may be services corresponding to different types of receive ends and/or different types of transmit ends. For example, the different types of services may be V2V services, V2P services, V2I services, P2V services, P2P services, P2I services, and the like. Alternatively, for example, the different types of services may be identified by using application layer identifiers carried at an application layer or transmitted by an upper layer (above the access stratum), for example, an ITS-AID (ITS Application Identifier) or a PSID (Provider Service Identifier).

Different destination addresses indicate different receive ends. For example, when a terminal A communicates with a terminal B and the terminal A communicates with a terminal C, corresponding destination addresses are usually different. Optionally, when the terminal performs broadcast communication, there may be a mapping relationship between a destination address and a service type.

In addition, the reliability reflects a transmission reliability requirement/level of the data or reflects an importance degree/importance level of the data. The transmission reliability requirement may be, but is not limited to, an end-to-end transmission reliability requirement. For example, the transmission reliability may be defined as 1— bit error ratio (1—bit error rate), 1— symbol error ratio (1—symbol error rate), 1— packet error ratio (1—packet error rate), or the like. For a detailed definition, refer to descriptions in an LTE protocol defined by the 3rd generation partnership project. Higher reliability indicates that the data is more important.

The delay reflects a transmission delay requirement of the data. For example, the delay may be an end-to-end transmission delay, an air interface delay requirement, a packet delay budget, a transmission time interval, or the like.

The data attribute may be, but is not limited to, an identifier, an index, or other information pointing to or indicating the data attribute. For example, the data attribute is reliability. The reliability may be a reliability identifier, a reliability index, or the reliability itself.

Because to-be-transmitted data having different data attributes or different identifiers may need to be transmitted by using different carrier frequencies, for each piece of to-be-transmitted data, there is a carrier frequency or a carrier frequency set on which the data is allowed to be sent.

For example, according to regulations in different regions, different V2X services may need to be transmitted by using different carrier frequencies. For example, a service type 1 is a security service, and the service needs to be transmitted on carrier frequencies {CC1, CC2}, and a service type 2 is a non-security service, and the service needs to be transmitted by using a carrier frequency {CC3}.

In addition, the base station may configure data with different priorities to be transmitted by using different carrier frequencies. For example, the base station may configure, by using RRC signaling, a carrier frequency set {CC1, CC2, CC3} for data whose priority is 1 and a carrier frequency set {CC1, CC4, CC5} for data whose priority is 2. In this way, the data whose priority is 1 is allowed to be transmitted by using the carrier frequency CC1, CC2, or CC3, and the data whose priority is 2 is allowed to be transmitted by using the carrier frequency CC3, CC4, or CC5.

In this way, to-be-transmitted data whose corresponding service type is 1 and priority is 1 can be transmitted by using only a common carrier frequency (that is, an intersection set), namely, {CC1, CC2}, of a carrier frequency set {CC1, CC2} and a carrier frequency set {CC1, CC2, CC3}. In other words, a carrier frequency that supports the to-be-transmitted data is CC1 or CC2.

Example 2

A transmission carrier frequency set of the terminal is {CC1, CC2, CC3}, and the to-be-transmitted data is allowed to be transmitted on carrier frequencies {CC1, CC3}. If the third carrier frequency is a carrier frequency with a maximum channel congestion degree in carrier frequencies that are in transmission carrier frequencies of the terminal and that support the to-be-transmitted data, the first condition is an activation condition, and the channel congestion degree on the third carrier frequency is greater than or equal to the first channel congestion threshold, the third carrier frequency is CC3, and corresponds to a channel congestion degree of 0.3. In this case, a condition for performing duplicate transmission is not met.

Example 3

The third carrier frequency is configured by the network device by using RRC signaling, and the RRC signaling may be a SIB or dedicated RRC signaling. For example, the base station configures the third carrier frequency as CC2 by using dedicated RRC signaling, the first condition is an activation condition, the channel congestion degree on the third carrier frequency is greater than or equal to the first channel congestion threshold, and the terminal determines that a channel congestion degree 0.6 corresponding to CC2 is greater than 0.5. In this case, duplicate transmission is activated. The PDCP layer needs to deliver the same to-be-sent data to the first logical channel and the second logical channel, send the data that is on the first logical channel by using the first carrier frequency, and send the data that is on the second logical channel by using the second carrier frequency.

Generally, neither an excessively low channel congestion degree nor an excessively high channel congestion degree is suitable for duplicate data transmission. If the channel congestion degree is excessively low, it indicates that a channel condition is good and duplicate data transmission is not required. If the channel congestion degree is excessively high, it indicates that a channel condition is already very poor. In this case, if duplicate data transmission is performed, more resources need to be consumed, further deteriorating the channel condition. Therefore, duplicate data transmission may not be required, either. The channel congestion information may be implemented as a threshold or a range.

For other specific forms of the channel congestion degree, a manner of configuring, obtaining, or determining a carrier frequency that supports the to-be-transmitted data, and an implementation form of the third carrier frequency, examples are not given one by one in this application.

It should be noted that the RRC signaling or the preconfiguration information sent by the network device may further include a network parameter of another activation condition. This is not limited in the embodiments.

In addition, it should be noted that alternatively, the RRC signaling or the preconfiguration information delivered by the network device may directly include the first condition, to facilitate determining, by the terminal, whether to duplicately transmit the PDCP layer data.

Optionally, the information used to indicate the first condition may further include the reliability information. When the information used to indicate the first condition is the reliability information, the first condition is also related to reliability of the to-be-sent data.

Specifically, the reliability information includes any one of the first reliability threshold, a first enumerated reliability value, and a first reliability range.

The first condition includes any one of the following:
the reliability of the to-be-transmitted data is greater than or equal to the first reliability threshold;
the reliability of the to-be-transmitted data is equal to the first enumerated reliability value, where the enumerated value may be a group of discrete values, identifiers, or indexes, that the reliability of the to-be-transmitted data is equal to the first enumerated reliability value means that the reliability of the to-be-transmitted data is equal to any item in the first enumerated reliability value, and for example, if the reliability of the to-be-transmitted data is reliability 1, and the first enumerated reliability value is {reliability 1, reliability 5, reliability 6}, the reliability of the to-be-transmitted data is equal to the first enumerated reliability value; or
the reliability of the to-be-transmitted data falls within the first reliability range.

Whether the first reliability range includes boundary values of the first reliability range is not limited in this application, and a plurality of possible combinations such as (A1, B1), (A1, B1], [A1, B1), and [A1, B1] may be included, where "C" indicates that an end value is not included, and "]" indicates that an end value is included.

The reliability information may be a specific value reflecting a reliability degree, for example, 99.99% or 99.999%. Alternatively, the reliability information is a relative value reflecting a reliability degree. For example, the reliability information may be high reliability, medium reliability, or low reliability. Certainly, more levels may be obtained through classification based on different reliability degrees. This is not limited in this application.

In this application, the reliability information may be not limited to an identifier, an index, or other information used to point to or indicate the reliability information. That the reliability information is the first reliability threshold is used as an example. The first reliability threshold may be represented by using an identifier, an index, or the first reliability threshold itself.

During specific implementation, different identifiers may be used to represent reliability degrees/levels or importance degrees/levels of data. For example, the reliability information is a relative value reflecting a reliability degree. 1 represents high reliability, 2 represents medium reliability, and 3 represents low reliability; or on the contrary, 1 represents low reliability, and 2 represents medium reliability, and 3 represents high reliability.

Further, the reliability information may be carried in the RRC signaling, such as a SIB message or dedicated RRC signaling, sent by the network device to the terminal, or may be carried in a MAC CE or DCI.

Further, when the reliability information is carried in the MAC CE, the reliability information may be embodied by using a bitmap (bitmap). Different bits in the bitmap represent different reliability/importance levels or reliability ranges, and different values of corresponding bits represent whether to perform duplicate data transmission. For example, different values of corresponding bits represent whether to activate duplicate data transmission.

For example, reliability corresponding to data is classified into three levels: low reliability, medium reliability, and high reliability. Different reliability levels are represented by using fixed bits. As shown in Table 1, in a bitmap, each bit may be sequentially corresponding to one reliability level in ascending order of reliability. Certainly, each bit may alternatively be sequentially corresponding to one reliability level in descending order of reliability. Details are not described herein.

TABLE 1

| High reliability | Medium reliability | Low reliability |
| --- | --- | --- |

When a bit is a first value, the terminal may be indicated to activate duplicate transmission of to-be-sent data whose reliability corresponds to the bit. When a bit is a second value, the terminal may be indicated to deactivate duplicate transmission of to-be-sent data whose reliability corresponds to the bit. For example, when the first value is 1, the second value may be 0.

Using a format of the bitmap shown in Table 1 as an example, the reliability information is carried in the bitmap, as shown in Table 2 below.

TABLE 2

| 1 | 0 | 0 |
| --- | --- | --- |

The reliability information is used to activate the terminal to duplicately transmit to-be-sent data with high reliability. To be specific, when the to-be-sent data at the PDCP layer of the terminal corresponds to high reliability, the terminal delivers the to-be-sent data at the PDCP layer to two different logical channels, and sends the to-be-sent data by using different carrier frequencies.

Further, the high reliability, the medium reliability, and the low reliability may correspond to different reliability values. For example, reliability of data corresponding to the high reliability is greater than 99.999%.

In addition, a bit in the bitmap may alternatively be used to identify a reliability range, as shown in Table 3. Whether a boundary value is included is not limited in this application.

TABLE 3

| 99.99-99.999% | 99.9-99.99% | 99.0-99.9% |
| --- | --- | --- |

Specifically, the format of the bitmap shown in Table 3 is used as an example. If the reliability information is carried in the bitmap, as shown in Table 3, the reliability information is used to activate the terminal to duplicately transmit to-be-sent data whose reliability falls within a range of 99.99-99.999%. To be specific, the terminal delivers, to two different logical channels, the to-be-sent data that is at the PDCP layer and whose reliability falls within the range of 99.99-99.999%, and sends the to-be-sent data by using different carrier frequencies.

Optionally, the reliability range may alternatively be implicit. The reliability ranges shown in FIG. 3 may also be represented by Table 4. Referring to Table 4, a meaning indicated by the last bit in the bitmap may be 99.0-99.9%.

TABLE 4

| 99.999% | 99.9% | 99.0% |
| --- | --- | --- |

When detecting that the first condition is met, the terminal performs the foregoing step 103. On the contrary, if the first condition is not met, an action of separately delivering the data at the PDCP layer to the two different logical channels is not triggered.

For example, the first condition is an activation condition, and the reliability information configured by the network device by using the RRC signaling is 1, indicating high reliability or high importance. When the reliability corresponding to the to-be-sent data of the terminal is high reliability or high importance, duplicate data transmission is activated. The PDCP layer delivers the to-be-sent data to two different logical channels.

For example, the first condition is an activation condition, and the reliability information configured by the network device by using the RRC signaling is a first reliability threshold 99.99%. If the reliability corresponding to the to-be-sent data on the terminal side is 99.999%, which is greater than the first reliability threshold, duplicate data transmission is activated. The PDCP layer delivers the to-be-sent data to two different logical channels.

For example, the first condition is an activation condition, the reliability information configured by the network device by using the RRC signaling is 1, indicating high reliability, and data reliability corresponding to the high reliability is greater than 99.999%. If the reliability corresponding to the to-be-sent data on the terminal side is 99.9999%, which is greater than the first reliability threshold, duplicate data transmission is activated. The PDCP layer delivers the to-be-sent data to two different logical channels.

Optionally, before duplicate data transmission is performed, that is, when conventional data transmission is performed, the first carrier frequency may be already available to the terminal, and the terminal transmits the data that is on the first logical channel by using the first carrier frequency. Alternatively, the first carrier frequency set may be already available to the terminal, and the terminal transmits the data that is on the first logical channel by using the first carrier frequency in the first carrier frequency set.

In addition, the terminal may further determine the first carrier frequency based on data reliability, for example, the first reliability and the first logical channel that has a correspondence with the first reliability, where the first carrier frequency is used for transmission. The correspondence may be explicit or implicit.

For example, the base station configures a correspondence between a reliability identifier of the terminal and a logical channel by using dedicated RRC signaling. For example, a first reliability identifier 1 corresponds to a logical channel identifier 1 (LCID 1), and a first reliability identifier 2 corresponds to a logical channel identifier 2 (LCID 2). Before duplicate transmission is performed, that is, when conventional data transmission is performed, a single piece of data is delivered to only a single logical channel. If first data reliability corresponding to data 1 is the first reliability identifier 1, the terminal delivers the first data to the first logical channel, and sends the first data by using the first carrier frequency. The logical channel identifier 1 may indicate the first logical channel. It may be understood that a plurality of different reliability identifiers may alternatively correspond to one LCID.

In a feasible implementation, that the terminal determines the first carrier frequency and the second carrier frequency may be, but is not limited to, determining, by an RRC layer, the first carrier frequency and the second carrier frequency. The RRC layer may determine different carrier frequencies used to send the data that is on the two logical channels, that is, determine the first carrier frequency and the second carrier frequency. Specifically, the following manners may be used for determining, but this application is not limited thereto.

Specifically, the first condition is an activation condition. If the information used to indicate the first condition includes the first channel congestion threshold 0.6 and the first reliability threshold 99.99%, a transmission carrier frequency set of the terminal is {CC1, CC2, CC3}, where channel congestion degrees corresponding to the transmission carrier frequencies are respectively {0.2, 0.6, 0.3}, and the third carrier frequency is a carrier frequency with a maximum channel congestion degree in the transmission carrier frequencies. In this case, the third carrier frequency is CC2. Because the channel congestion degree 0.6 corresponding to the third carrier frequency is greater than the first channel congestion threshold 0.5, and the reliability corresponding to the to-be-sent data of the terminal is 99.999%, which is greater than the first reliability threshold 99.99%, duplicate data transmission is activated. The PDCP layer separately delivers the to-be-sent data to two different logical channels.

In a possible implementation, the terminal determines the first carrier frequency and the second carrier frequency by using signaling delivered by the network device. Specifically, if the RRC signaling or the preconfiguration information sent by the network device to the terminal includes at least two carrier frequency identifiers, the terminal determines the first carrier frequency and the second carrier frequency.

Optionally, the RRC signaling or the preconfiguration information sent by the network device to the terminal includes the information used to indicate the third carrier frequency set. For example, the RRC signaling or the preconfiguration information includes a plurality of carrier frequency identifiers pointing to carrier frequencies that are configured or preconfigured by the network device and that may be used for sidelink communication. The terminal determines the first carrier frequency and the second carrier frequency based on the third carrier frequency set, where the first carrier frequency and the second carrier frequency belong to the third carrier frequency set. It may be understood that the third carrier frequency set may alternatively be preconfigured.

Alternatively, the terminal determines the first carrier frequency set and the second carrier frequency set based on the third carrier frequency set, where carrier frequencies in the first carrier frequency set and the second carrier frequency set all belong to the third carrier frequency set, and elements in the first carrier frequency set are different from those in the second carrier frequency set.

The terminal selects the first carrier frequency from the first carrier frequency set, and selects the second carrier frequency from the second carrier frequency set. The selecting the first carrier frequency from the first carrier frequency set and selecting the second carrier frequency from the second carrier frequency set may be implemented at the RRC layer of the terminal, or may be implemented at the MAC layer.

In another possible implementation, the to-be-transmitted data has a data attribute, and the data attribute corresponds to a carrier frequency in the third carrier frequency set, where the correspondence may be implicit or explicit. The data attribute may include one or a combination of the following: a priority, reliability, a delay, a destination address, and a service type.

The data attribute may be, but is not limited to, an identifier, an index, or other pointing or indication information. For example, the data attribute is reliability. The reliability may be a reliability identifier, a reliability index, or the reliability itself.

After receiving, from the network device, the information used to indicate the third carrier frequency set, the terminal determines a fourth carrier frequency set based on the data attribute of the to-be-transmitted data. For example, the fourth carrier frequency set may include all available carrier frequency resources suitable for the to-be-transmitted data. It may be understood that the terminal does not necessarily need to use all the available carrier frequency resources. According to a capability (for example, a transmit chain capability) of the terminal or another constraint (a carrier frequency supported by a to-be-transmitted data packet, or the like), the terminal may use only some carrier frequencies in the fourth carrier frequency set in a period of time or in single information transmission. The terminal determines the first carrier frequency set and the second carrier frequency set based on the fourth carrier frequency set, or directly determines the first carrier frequency and the second carrier frequency based on the fourth carrier frequency set.

It should be noted that the third carrier frequency set may be the same as or different from the fourth carrier frequency set. This is not limited in this application.

For example, a priority of the to-be-transmitted data is 1, and the base station configures the information used to indicate the carrier frequency set as a correspondence between a priority and a carrier frequency set. If there are two priorities, data whose priority is 1 has a correspondence with a carrier frequency set {CC1, CC2, CC3, CC4}, where CC1, CC2, CC3, and CC4 represent four different carrier frequencies; and data whose priority is 2 has a correspondence with a carrier frequency set {CC2, CC3, CC5, CC6}. After receiving the foregoing correspondences, the terminal may determine, based on the priority of the to-be-transmitted data, total available carrier frequency resources corresponding to the to-be-transmitted data. When it is determined that the priority of the to-be-transmitted data is 1, the corresponding fourth carrier frequency set is {CC1, CC2, CC3, CC4}.

A correspondence between the priority and a carrier frequency in the third carrier frequency set may be implicit or explicit, or may have a plurality of other implementation forms. For example, configuration information of each carrier frequency carries a priority corresponding to the carrier frequency. For example, configuration information of a carrier frequency CC1 includes {identifier of the carrier frequency 1, identifier of the priority 1}, and configuration information of a carrier frequency CC2 includes {identifier of the carrier frequency 2, identifier of the priority 1}. This form may indicate that both the carrier frequency 1 and the carrier frequency 2 support the to-be-transmitted data whose priority is 1. If the priority of the to-be-transmitted data is 1, the fourth carrier frequency set is {CC1, CC2}. Certainly, the fourth carrier frequency set may include only one carrier frequency.

For example, the first data attribute of the to-be-transmitted data includes a priority 1 and a destination address 1. The base station configures that the data priority 1 has a correspondence with a carrier frequency set {CC1, CC2, CC3, CC4}, where CC1, CC2, CC3, and CC4 represent four different carrier frequencies; and configures that a data priority 2 has a correspondence with a carrier frequency set {CC2, CC3, CC5, CC6}. In addition, the base station configures that the destination address 1 has a correspondence with a carrier frequency set {CC1, CC2}, and a destination address 2 has a correspondence with a carrier frequency set {CC3, CC4}. After receiving the foregoing correspondences, the terminal may determine, based on the priority and the destination address of the to-be-transmitted data, total available carrier frequency resource corresponding to the to-be-transmitted data. When it is determined that the data priority corresponding to the to-be-transmitted data is 1 and the destination address corresponding to the to-be-transmitted data is 1, the corresponding fourth carrier frequency set is {CC1, CC2}.

Similarly, when the data attribute is any one or a combination of first reliability, a first delay, a first destination address, and a first service type, the terminal may also determine, based on the information for indicating the carrier frequency set, a carrier frequency set supported by the current to-be-transmitted data. Then, the terminal determines the first carrier frequency set and the second carrier frequency set based on the carrier frequency set, or directly selects the first carrier frequency and the second carrier frequency based on the carrier frequency set. Carrier frequencies in the first carrier frequency set and carrier frequencies in the second carrier frequency set all belong to the fourth carrier frequency set.

In another possible implementation, the to-be-transmitted data has a data attribute, and the data attribute corresponds to a carrier frequency in the first carrier frequency set and a carrier frequency in the second carrier frequency set, where the correspondence may be implicit or explicit. The data attribute may include one or a combination of the following: a priority, reliability, a delay, a destination address, and a service type.

The data attribute may be, but is not limited to, an identifier, an index, or other pointing or indication information. For example, the data attribute is reliability. The reliability may be a reliability identifier, a reliability index, or the reliability itself.

The terminal receives information from the network device, where the information includes information used to indicate the first carrier frequency set and the second carrier frequency set, and information used to indicate the data attribute corresponding to the first carrier frequency set and the second carrier frequency set. The terminal determines the first carrier frequency set and the second carrier frequency set based on the data attribute of the to-be-transmitted data, or directly determines the first carrier frequency and the second carrier frequency based on the data attribute of the to-be-transmitted data. The information may be carried in RRC signaling or a preconfigured message.

For example, dedicated RRC signaling sent by the network device includes:
{first destination address identifier, CC1, CC2} and {second destination address identifier, CC3, CC4}.

The destination address corresponding to to-be-sent data of the terminal is a first destination address. The terminal may determine, based on the dedicated RRC signaling, that the first carrier frequency is CC1 and the second carrier frequency is CC2, where CC1 may point to the first carrier frequency, and CC2 may point to the second carrier frequency.

For another example, a SIB message sent by the network device includes {first destination address identifier, {CC1, CC2}, {CC3, CC4}} and {second destination address identifier, CC3, CC4}.

If the destination address corresponding to the to-be-sent data of the terminal is a first destination address, the terminal determines, based on the dedicated RRC signaling, that the first carrier frequency set is {CC1, CC2} and the second carrier frequency set is {CC3, CC4}.

For another example, dedicated RRC signaling sent by the network device includes:
{first destination address identifier, first reliability identifier, CC1, CC2} and {second destination address identifier, first reliability identifier, CC3, CC4}.

If the destination address corresponding to to-be-sent data of the terminal is a first destination address, and the reliability corresponding to to-be-sent data is first reliability, the terminal determines, based on the dedicated RRC signaling, that the first carrier frequency is CC1 and the second carrier frequency is CC2, where CC1 may point to the first carrier frequency, and CC2 may point to the second carrier frequency.

For another example, dedicated RRC signaling sent by the network device includes:
{first destination address identifier, first reliability identifier, {CC1, CC2}, {CC3, CC4}} and {second destination address identifier, first reliability identifier, CC3, CC4}.

If the destination address corresponding to the to-be-sent data of the terminal is a first destination address, and the reliability corresponding to the to-be-sent data is first reliability, the terminal determines, based on the dedicated RRC signaling, that the first carrier frequency set is {CC1, CC2} and the second carrier frequency set is {CC3, CC4}.

It should be noted that, when the current transmission carrier frequencies of the terminal do not include the first carrier frequency or the second carrier frequency, the terminal may perform carrier selection or carrier reselection, to transmit the data that is on the first logical channel by using the first carrier frequency, and transmit the data that is on the second logical channel by using the second carrier frequency. This is not limited in the present invention.

According to the data transmission method provided in this embodiment, when a condition for activating duplicate data transmission is met, the terminal sends, over the sidelink, data that is on the first logical channel and data that is on the second logical channel by using different carrier frequencies. In this way, over the sidelink, a same data packet is sent on two logical channels by using different carrier frequencies, and a receiving device can receive the duplicate same data packet, thereby improving data transmission reliability.

In addition, the first carrier frequency and the second carrier frequency may be determined by the RRC layer of the terminal, or may be determined by the MAC layer of the terminal.

For example, after duplicate data transmission is activated, the PDCP layer delivers the same to-be-sent data to the first logical channel and the second logical channel, but the RRC layer may not notify the MAC layer of the first logical channel and the second logical channel that are used for duplicate data transmission. Therefore, the MAC layer needs to determine two logical channels used for duplicate transmission, that is, the first logical channel and the second logical channel. In addition, the MAC layer may further maintain a plurality of logical channels.

Specifically, a method for determining the logical channels by the MAC layer includes the following several possible implementations:

In a possible implementation, the MAC layer determines the first logical channel and the second logical channel based on a data attribute on each logical channel. The data attribute may be one or a combination of a priority, a destination address, a delay, a service type, and reliability.

It may be understood that the first logical channel and the second logical channel include the same to-be-sent data, and data attributes corresponding to the data are the same. For example, the data attributes include a priority and a destination address, and the to-be-transmitted data has a first priority and a first destination address. Therefore, data attributes corresponding to the first logical channel and the second logical channel are the same. To be specific, both priorities corresponding to the first logical channel and the second logical channel are the first priority, and both destination addresses corresponding to the first logical channel and the second logical channel are the first destination address. The first logical channel and the second logical channel may be determined by detecting whether the data attributes on the logical channels are the same.

In addition, before detecting whether the data attributes on the logical channels are the same, the terminal further needs to obtain information about the data attributes on the logical channels.

The MAC layer detects whether identification information or data attributes on two logical channels are the same. If the identification information or the data attributes are the same, it indicates that there are already two logical channels used for duplicate data transmission. In this case, duplicate data transmission may be performed.

Optionally, the MAC layer preliminarily determines the first logical channel and the second logical channel by detecting a data attribute on each logical channel. In addition, the MAC layer further needs to determine whether there is to-be-transmitted data on the first logical channel and/or the second logical channel, to determine whether duplicate data transmission at the PDCP layer has been performed. If the MAC layer detects that there is to-be-transmitted data on both of the logical channels, and data attributes on the first logical channel and the second logical channel are the same, it indicates that duplicate data transmission at the PDCP layer has been activated, that is, to-be-transmitted data at the same PDCP layer is delivered to the two logical channels.

For example, there are three logical channels at the MAC layer, which are respectively referred to as a logical channel 1, a logical channel 2, and a logical channel 3. Data attributes (for example, data priorities) corresponding to the logical channels 1, 2, and 3 are respectively a priority 1, a priority 2, and a priority 1. Because the data attributes on the logical channels 1 and 3 are the same (both are the priority 1), it is determined that the logical channel 1 and the logical channel 3 are logical channels used for duplicate data transmission.

In addition, the terminal may further send indication information to the MAC layer through the RRC layer, to indicate the first logical channel and the second logical channel, or indicate that duplicate transmission at the PDCP layer has been activated.

Optionally, a correspondence may be established between each logical channel and a data attribute corresponding to each logical channel when the logical channel is established. The data attribute corresponding to the logical channel is related to data on the logical channel. The data attribute corresponding to the logical channel may be equivalent to a data attribute corresponding to the data on the logical channel.

In another implementation, there is a correspondence between or there may be a pairing relationship between an ID (Identity) of the first logical channel and an ID of the second logical channel, where duplicate data transmission is performed on both of the logical channels. The correspondence may be configured or preconfigured by the base station by using RRC signaling, or may be specified in a protocol. In this case, the MAC layer determines the first logical channel and the second logical channel depending on whether IDs of logical channels satisfy the correspondence.

It should be noted that, the correspondence may be represented by using an operation relationship between the logical channel IDs of the two logical channels, or may be represented by using a specific correspondence. In this application, the logical channel identifier may be a logical channel ID.

For example, the logical channels for duplicate transmission satisfy the following correspondence: for example, a difference between or a sum of the ID of the second logical channel and the ID of the first logical channel meets a preset value. That the difference meets the preset value is used as an example. For example, LCID 2−LCID 1=M, where the LCID 2 represents the ID (Identity) of the second logical channel, the LCID 1 represents the ID of the first logical channel, and M is the preset value and is a positive integer. Alternatively, the correspondence between the two logical channels is explicitly represented, for example, {logical channel 1, logical channel 11} and {logical channel 2, logical channel 12}.

For example, there is a correspondence between the logical channel 1 and the logical channel 11, and there is a correspondence between the logical channel 2 and a logical channel 12. Both of the correspondences meet: ID of the second logical channel—ID of the first logical channel=M, where M is equal to 10. When duplicate data transmission is not performed, IDs of logical channels used by the terminal are 1 to 10.

When the terminal detects that there are logical channels with LCIDs 1 and 11, it indicates that there are already two logical channels used for duplicate data transmission. In this case, duplicate data transmission may be performed, or it is determined that duplicate data transmission is triggered. To be specific, a same data packet is to be delivered to two different logical channels. The terminal may determine, based on the correspondence between the logical channel IDs of the logical channel 1 and the logical channel 11, that the logical channel 1 is a logical channel matching the logical channel 11, to determine that the first logical channel is the logical channel 1 and the second logical channel is the logical channel 11.

In another optional implementation, the MAC layer preliminarily determines the first logical channel and the second logical channel by using a correspondence between IDs of logical channels. In addition, the MAC layer further needs to determine whether there is to-be-transmitted data on the first logical channel and/or the second logical channel, to determine whether duplicate data transmission at the PDCP layer has been performed. If the MAC layer detects that there is to-be-transmitted data on both of the logical channels, and IDs of the first logical channel and the second logical channel satisfy the correspondence, it indicates that duplicate data transmission at the PDCP layer has been activated, that is, to-be-transmitted data at the same PDCP layer is delivered to the two logical channels.

When the terminal detects that there are logical channels with LCIDs 1 and 11, and the terminal determines that there is data on the logical channel with the LCID 11, it may be determined that duplicate data transmission has been triggered. To be specific, a same data packet has been delivered to two different logical channels.

Alternatively, the first carrier frequency and the second carrier frequency may be determined by the MAC layer of the terminal. The determining method is specifically but not limited to the following:

The MAC layer receives the information that is delivered by the RRC layer and used to indicate the third carrier frequency set or used to indicate the fourth carrier frequency set, and then determines the first carrier frequency and the second carrier frequency based on the third carrier frequency set or the fourth carrier frequency set. A specific method is the same as the method for determining the first carrier frequency and the second carrier frequency by the RRC layer, and details are not described herein again. It may be understood that the first carrier frequency and the second carrier frequency may alternatively come from the first carrier frequency set and the second carrier frequency set respectively, and the first carrier frequency set is orthogonal to the second carrier frequency set. A specific method is the same as the method for determining the first carrier frequency set and the second carrier frequency set by the RRC layer, and details are not described herein again.

It should be noted that a time sequence of determining the first logical channel and the second logical channel by the MAC layer and determining the first carrier frequency and the second carrier frequency by the MAC layer is not limited in this application.

In addition, the method in the foregoing embodiment further includes: when a second condition is met, stopping, by the PDCP layer of the terminal, delivering the to-be-transmitted data to the first logical channel and the second logical channel.

Further, this process includes: obtaining, by the terminal, information used to indicate the second condition; and when the second condition is met, stopping sending, by the terminal over the sidelink, the to-be-transmitted data that is on the first logical channel by using the first carrier frequency and the to-be-transmitted data that is on the second logical channel by using the second carrier frequency.

The information used to indicate the second condition includes any one of a third channel congestion threshold, a fourth channel congestion threshold, and a second channel congestion range.

The second condition includes:
a channel congestion degree on a fourth carrier frequency is greater than or equal to the third channel congestion threshold;
a channel congestion degree on a fourth carrier frequency is less than or equal to the fourth channel congestion threshold; or
a channel congestion degree on a fourth carrier frequency falls within the second channel congestion range.

The fourth carrier frequency may be configured or pre-configured by the network device by using the RRC signaling; the fourth carrier frequency may be any one of the transmission carrier frequencies of the terminal; the fourth carrier frequency may be the transmission carrier frequency with the minimum channel congestion degree in the transmission carrier frequencies of the terminal; the fourth carrier frequency may be the transmission carrier frequency with the maximum channel congestion degree in the transmission carrier frequencies of the terminal; the fourth carrier frequency may be any one of the transmission carrier frequencies that are in the transmission carrier frequencies of the terminal and that support the to-be-transmitted data packet; the fourth carrier frequency may be the carrier frequency with the minimum channel congestion degree in the carrier frequencies that are in the transmission carrier frequencies of the terminal and that support the to-be-transmitted data packet; or the fourth carrier frequency may be the carrier frequency with the maximum channel congestion degree in the carrier frequencies that are in the transmission carrier frequencies of the terminal and that support the to-be-transmitted data packet.

Optionally, the fourth carrier frequency is a carrier frequency in the first carrier frequency set or the second carrier frequency set. In addition, the first carrier frequency set corresponds to the first logical channel, and the second carrier frequency set corresponds to the second logical channel. The fourth carrier frequency may be the same as or different from the third carrier frequency.

Optionally, the fourth carrier frequency may be any one of the transmission carrier frequencies of the terminal that belong to the first carrier frequency set; the fourth carrier frequency may be a transmission carrier frequency with a minimum channel congestion degree in the transmission carrier frequencies of the terminal that belong to the first carrier frequency set; the fourth carrier frequency may be a transmission carrier frequency with a maximum channel congestion degree in the transmission carrier frequencies of the terminal that belong to the first carrier frequency set; the fourth carrier frequency may be any one of the transmission carrier frequencies that support the to-be-transmitted data packet and that are in the transmission carrier frequencies of the terminal belonging to the first carrier frequency set; the fourth carrier frequency may be a carrier frequency with a minimum channel congestion degree in the carrier frequencies that support the to-be-transmitted data packet and that are in the transmission carrier frequencies of the terminal belonging to the first carrier frequency set; or the fourth carrier frequency may be a carrier frequency with a maximum channel congestion degree in the carrier frequencies that support the to-be-transmitted data packet and that are in the transmission carrier frequencies of the terminal belonging to the first carrier frequency set.

Alternatively, the fourth carrier frequency may be any one of the transmission carrier frequencies of the terminal that belong to the second carrier frequency set; the fourth carrier frequency may be a transmission carrier frequency with a minimum channel congestion degree in the transmission carrier frequencies of the terminal that belong to the second carrier frequency set; the fourth carrier frequency may be a transmission carrier frequency with a maximum channel congestion degree in the transmission carrier frequencies of the terminal that belong to the second carrier frequency set; the fourth carrier frequency may be any one of the transmission carrier frequencies that support the to-be-transmitted data packet and that are in the transmission carrier frequencies of the terminal belonging to the second carrier frequency set; or the fourth carrier frequency may be a carrier frequency with a minimum channel congestion degree in the carrier frequencies that support the to-be-transmitted data packet and that are in the transmission carrier frequencies of the terminal belonging to the second carrier frequency set; or the fourth carrier frequency may be a carrier frequency with a maximum channel congestion degree in the carrier frequencies that support the to-be-transmitted data packet and that are in the transmission carrier frequencies of the terminal belonging to the second carrier frequency set.

In this embodiment, when the terminal meets the second condition, the terminal stops sending the to-be-transmitted data that is in the PDCP entity to the first logical channel and the second logical channel, to save network resources.

Optionally, the second condition may be a deactivation condition.

In another embodiment of this application, a data transmission method is further provided. In the method, a terminal reports reliability of sidelink data of the terminal to a network device, so that the network device can better schedule a resource for transmission of the sidelink data.

Figure 4:
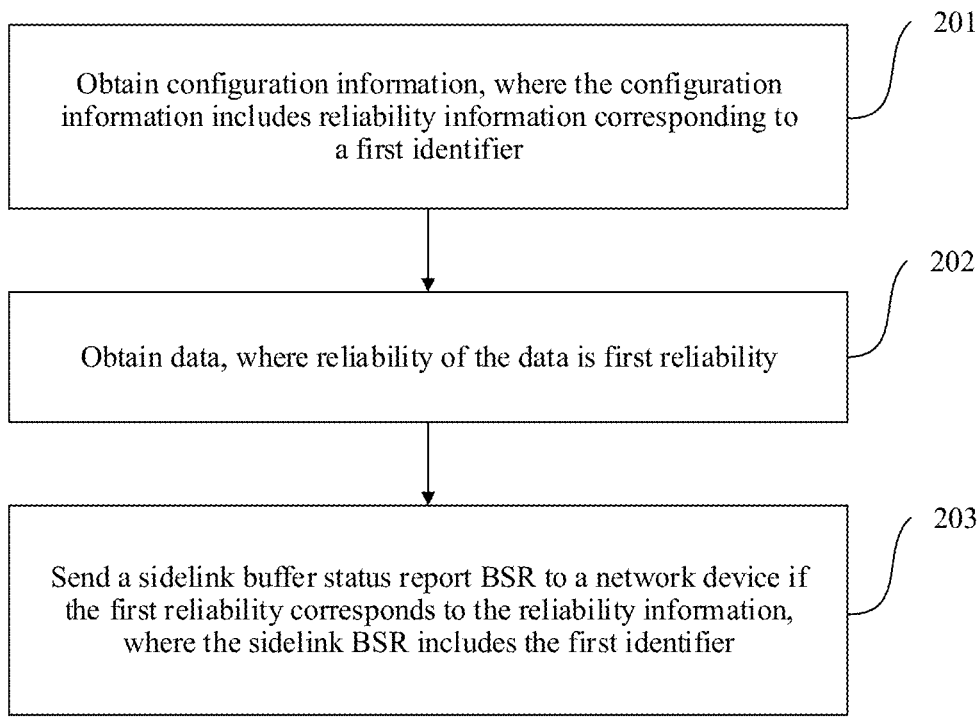
FIG. 4 is a flowchart of another data transmission method according to this application.

As shown in FIG. 4, the method may include the following steps.

Step 201: The terminal obtains configuration information from the network device, where the configuration information includes reliability information corresponding to a first identifier.

Optionally, the configuration information further includes the first identifier. The first identifier includes: a first logical channel group identity; a first destination address identifier; or a first logical channel group identity and a first destination address identifier.

Specifically, the terminal may obtain the configuration information in a plurality of manners as follows:

In a possible manner, the terminal obtains the configuration information by using RRC signaling, where the RRC signaling may be a SIB message or dedicated RRC signaling. The terminal receives the RRC signaling, and obtains the reliability information that corresponds to the first identifier.

In another possible manner, the terminal obtains the configuration information by using a data packet that carries the configuration information and that is sent by the network device. For example, the configuration information may be included in a MAC control element (control element) ("MAC CE" for short). After receiving the data packet, the terminal obtains the first identifier, the reliability information, and a correspondence between the first identifier and the reliability information.

In still another possible manner, the configuration information is carried on a PDCCH, and the terminal obtains the first identifier, the reliability information, and a correspondence between the first identifier and the reliability information by obtaining DCI on the PDCCH.

In still another possible manner, the network device sets the configuration information in the preconfiguration information, and the terminal obtains the configuration information from the preconfiguration information.

The first identifier may be a first logical channel group identity (LCG ID) or a first destination address identifier, or may be a first LCG ID and a first destination address identifier.

The reliability information includes a reliability threshold, an enumerated reliability value, or a reliability range.

In addition, the reliability information may be not limited to an identifier, an index, or other information used to point to or indicate the reliability information. The correspondence between the first identifier and the reliability information may be implicit or explicit.

The following uses an example in which the first identifier is a first LCG ID, the reliability information is an enumerated reliability value, the enumerated reliability value includes a series of discrete reliability values, and the reliability value is indicated by using a reliability identifier.

In a possible implementation, the configuration information generated by the network device may include at least one LCG ID and at least one reliability identifier, for example, include an LCG ID 1, a reliability identifier 1, an LCG ID 2, and a reliability identifier 2. The LCG ID 1 corresponds to the reliability identifier 1, the LCG ID 2 corresponds to the reliability identifier 2, the reliability identifier 1 may point to an enumerated reliability value 1, and the reliability identifier 2 may point to an enumerated reliability value 2. After receiving the configuration information, the terminal may determine, by using the configuration information, that the LCG ID 1 has a correspondence with the enumerated reliability value 1 and the LCG ID 2 has a correspondence with the enumerated reliability value 2.

In another possible implementation, the configuration information may not include an LCG ID, but may include only at least one piece of reliability information. The terminal may determine, based on a pre-agreed sequence or rule, an LCG ID corresponding to the at least one piece of reliability information. The sequence may be specified in a protocol, or agreed upon by the network device and the terminal device through negotiation. For example, because the LCG ID may be a sequence number, both parties may agree that LCG IDs are arranged in ascending order. For example, if LCG IDs are sequentially numbered 0, 1, 2, and 3, the configuration information may not include an LCG ID, but may include only at least one piece of reliability information. The terminal may determine, according to a sequence of the at least one piece of reliability information, a logical channel group identity corresponding to the at least one piece of reliability information.

For example, the configuration information includes only {reliability identifier 1}, {reliability identifier 2, reliability identifier 3}, {reliability identifier 4}, and {reliability identifier 5, reliability identifier 6}. Both parties agree that LCG IDs are arranged in ascending order. After receiving the configuration information, the terminal may determine that {reliability identifier 1} corresponds to a logical channel group identity numbered 0, {reliability identifier 2, reliability identifier 3} corresponds to a logical channel group identity numbered 1, and {reliability identifier 4} and {reliability identifier 5, reliability identifier 6} respectively correspond to logical channel group identities numbered 2 and 3.

Certainly, it may be understood that the first configuration information may include only one piece of reliability information, and the reliability information corresponds to the logical channel group identity numbered 0.

Step 202: The terminal obtains data, where data reliability of the data is first data reliability.

Specifically, each piece of sidelink data has a data attribute, and the data attribute may include reliability. For example, reliability of the data obtained by the terminal is the first reliability.

For the data attribute, refer to related descriptions in step 103 in the foregoing embodiment. Details are not described herein again. A time sequence of step 201 and step 202 is not limited in this application. Step 202 may be performed before step 201, or step 201 and step 202 may be simultaneously performed.

Step 203: Send a sidelink buffer status report BSR to the network device when the first reliability corresponds to the reliability information, where a first data field in the sidelink BSR is the first identifier.

Specifically, that the first reliability corresponds to the reliability information includes:

The reliability information includes a second reliability threshold, and that the first reliability corresponds to the reliability information includes: the first reliability is greater than or equal to the second reliability threshold;

the reliability information includes a third reliability threshold, and that the first reliability corresponds to the reliability information includes: the first reliability is less than or equal to the third reliability threshold;

the reliability information includes a second enumerated reliability value, and that the first reliability corresponds to the reliability information includes: the first reliability is equal to the second enumerated reliability value, where the enumerated value may be a group of discrete values, identifiers, or indexes, that the first reliability is equal to the second enumerated reliability value means that the first reliability is equal to any item in the second enumerated reliability value, and for example, if the first reliability is reliability 1 and the second enumerated reliability value is {reliability 1, reliability 5, reliability 6}, the first reliability corresponds to the second enumerated reliability value; or the reliability information includes a second reliability range, and that the first reliability corresponds to the reliability information includes: the first reliability falls within the second reliability range.

In an optional implementation, the terminal has data, and reliability corresponding to the data is the first reliability, and corresponds to the reliability information corresponding to the first identifier. The terminal sets the first data field in the sidelink buffer status report BSR as the first identifier, and sends the buffer status report (BSR) to the network device, to notify the network device that the terminal has the data whose reliability corresponds to the first reliability information. In this way, the network device learns of the data reliability of the sidelink data of the terminal.

It should be noted that there may be a specific BSR sending triggering condition. This is not limited in the present invention.

For example, for a data format of the sidelink BSR, a BSR sending triggering condition, and a method for calculating or counting a data buffer size, refer to related protocols in chapters 5.14.1.4 and 6.1.3 in 3rd generation partnership project TS 36.321 V15.0.0.

Optionally, the BSR is included in a MAC PDU sent by the terminal to the base station.

Optionally, the BSR is included in a MAC CE sent by the terminal to the base station.

Figures 5, 6:
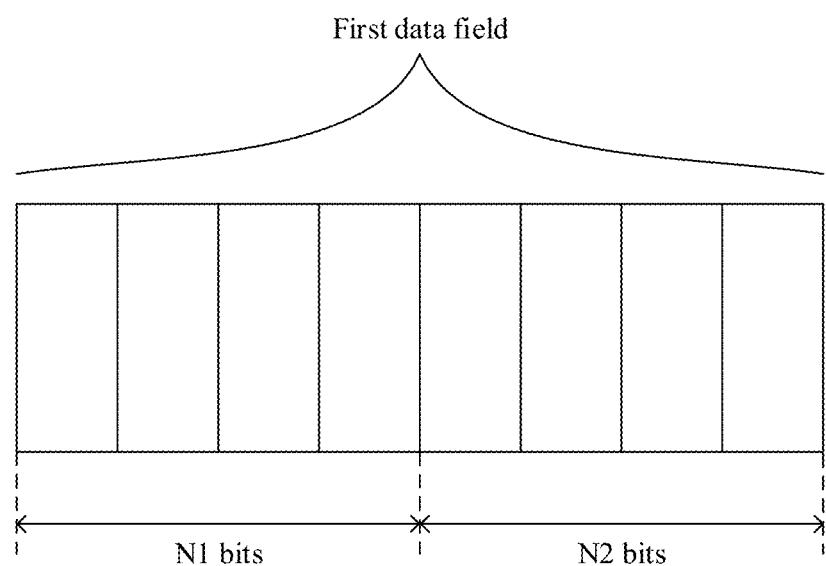
FIG. 5 is a schematic diagram of a sidelink BSR according to an embodiment of this application.
FIG. 6 is a schematic diagram of a first data field according to an embodiment of this application.

FIG. 5 shows a format of an LTE-V2X sidelink BSR. The BSR includes different data fields to indicate or reflect different information. For example, the LTE-V2X sidelink BSR includes a destination address index field (Destination index) used to identify a destination address, a data buffer size field (Buffer Size) used to identify a data buffer size, and a logical channel group identity field (LCG ID) used to identify a logical channel group identity. Different data fields may occupy different bits. For example, the destination address index field may occupy 3 bits. This is not limited in the present invention. A format of a conventional LTE V2X sidelink BSR imposes no limitation on this application, and this application uses an exactly different BSR format.

Optionally, the terminal may alternatively set a second data field in the BSR as a data buffer size of the terminal, so that the base station obtains more information about the sidelink data. Optionally, the data buffer size of the terminal is a data size of sidelink data that is of the terminal and that satisfies the reliability information. Certainly, it may be understood that FIG. 5 provides only some examples. A single BSR may include a plurality of destination address index fields, data buffer size fields, and logical channel group identity fields.

For example, the to-be-sent sidelink data of the terminal is data 1, data 2, and data 3, where reliability corresponding to the data 1 is a reliability identifier 1, a destination address 1, and a data size B1; reliability corresponding to the data 2 is a reliability identifier 2, a destination address 1, and a data size B2; and reliability corresponding to the data 3 is a reliability identifier 4, a destination address 2, and a data size B3. The data 1, the data 2, and the data 3 each may include a plurality of data packets. In a V2X service, different services may have different destination addresses. Optionally, the BSR may include different destination addresses.

In addition, the configuration information includes the first identifier and the reliability information that has the correspondence with the first identifier, for example, a reliability identifier 1 and a reliability identifier 2. The first identifier includes an LCG ID 1, and the reliability information includes a reliability identifier 1 and a reliability identifier 2. In this case, after receiving the configuration information, the sidelink BSR reported by the terminal to the network device may include {destination address 1, LCG ID 1, C1}, where C1 represents an identifier or an index corresponding to a sum of the data size B1 and the data size B2. After receiving the sidelink BSR, the network device may learn that the terminal has data whose destination address is 1, priorities are 1 and 2, and data volume is C1, to prepare for subsequent resource scheduling performed by the network device for the terminal.

Certainly, it may be understood that the configuration information may further include a correspondence between an LCG ID 2 and the reliability information, more first identifiers, more reliability identifiers, and correspondences between the first identifiers and the reliability identifiers. This is not limited in the embodiments of this application.

Optionally, C1 may be an index of a data size interval, and is used to indicate a range of the data buffer size of the terminal. C1 may be a specific precise value, or may be a range interval.

Optionally, the first configuration information further includes priority information, where a priority corresponding to the data is a first priority.

Specifically, the priority information includes a first priority threshold, and that the first priority corresponds to the priority information includes: the first priority is greater than or equal to the first priority threshold;

the priority information includes a second priority threshold, and that the first priority corresponds to the priority information includes: the first priority is less than or equal to the second priority threshold;

the priority information includes a first enumerated priority value, and that the first priority corresponds to the priority information includes: the first priority is equal to the first enumerated priority value, where the enumerated value may be a group of discrete values, identifiers, or indexes, that the first priority is equal to the first enumerated priority value means that the first priority is equal to any item in the first enumerated priority value, and for example, if the first priority is a priority 1 and the first enumerated priority value is {priority 1, priority 5, priority 6}, the first priority is equal to the first enumerated priority value; or the priority information includes a first priority range, and that the first priority corresponds to the priority information includes: the first priority falls within the first priority range.

Whether the first priority range includes boundary values of the first priority range is not limited in this application, and a plurality of possible combinations such as (A1, B1), (A1, B1], [A1, B1], and [A1, B1] may be included, where "(" indicates that an end value is not included, and "]" indicates that an end value is included.

In this application, the priority information may be not limited to an identifier, an index, or other information used to point to or indicate the priority information. That the priority information is the first priority threshold is used as an example. The first priority threshold may be pointed to by using an identifier, an index, or the first priority threshold itself.

That the first reliability corresponds to the reliability information includes: the first reliability corresponds to the reliability information and the first priority corresponds to the priority information. To be specific, the first data field in the sidelink BSR is set as the first identifier only when the to-be-sent data of the terminal meets constraint conditions of the reliability information and the priority information. The terminal sends the BSR including the first identifier to the network device, to notify the network device that the terminal has data whose reliability corresponds to the reliability information and whose priority corresponds to the priority information. In this way, the network device learns of the data reliability and the data priority of the sidelink data of the terminal.

Optionally, the terminal may alternatively set a second data field in the BSR as a data buffer size of the terminal, so that the base station obtains more information about the sidelink data. Optionally, the data buffer size of the terminal is a data size of sidelink data that is of the terminal and that satisfies both the reliability information and the priority information.

For example, the configuration information includes a correspondence between an LCG ID and reliability information: {reliability identifier 1}, {reliability identifier 1}, {reliability identifier 2}, and {reliability identifier 3, reliability identifier 4}.

In addition, the configuration information further includes: {priority identifier 1}, {priority identifier 2}, {priority identifier 3}, and {priority identifier 4}.

The terminal may obtain the following correspondence based on the configuration information:

TABLE 5

| LCG ID 1 | Priority identifier 1 | Reliability identifier 1 |
| LCG ID 2 | Priority identifier 2 | Reliability identifier 1 |
| LCG ID 3 | Priority identifier 3 | Reliability identifier 2 |
| LCG ID 4 | Priority identifier 4 | Reliability identifier 3 and reliability identifier 4 |

In another example, the sidelink data of the terminal is data 1 and data 2, where the data 1 corresponds to a priority identifier 1, a reliability identifier 1, a destination address 1, and a data size B1, and the data 2 corresponds to a priority identifier 4, a reliability identifier 3, a destination address 2, and a data size B2. If there are adequate uplink resources, content of the sidelink BSR set by the terminal is as follows:

{destination address 1, LCG ID 1, C1} and {destination address 2, LCG ID 4, C2}.

C1 represents an identifier or an index corresponding to the data size B1, and C2 represents an identifier or an index corresponding to the data size B2.

It should be noted that, sending the BSR needs to occupy a specific uplink resource. When uplink resources are insufficient, the terminal may send only a part of the BSR to the base station. That is, the BSR includes only one LCG ID and association information corresponding to the LCG ID. For example, the BSR may include only {destination address 1, LCG ID 1, C1}.

When there are a plurality of LCG IDs, different LCG IDs are prioritized during BSR reporting. The LCG IDs may be sequentially reported according to sequence numbers of the LCG IDs, or may be sequentially reported in descending order of reliability.

Optionally, the configuration information further includes priority information corresponding to a second identifier, and a priority corresponding to the data is a first priority. The second identifier may be the same as or different from the first identifier. It may be understood that a correspondence between the second identifier and the first priority may be explicit or implicit. In addition, the second identifier may be the same as or different from the first identifier.

Optionally, the second identifier may be a second logical channel group identity and/or a second destination address identifier.

Specifically, the priority information includes a third priority threshold, and that the first priority corresponds to the priority information includes: the first priority is greater than or equal to the first priority threshold;

the priority information includes a fourth priority threshold, and that the first priority corresponds to the priority information includes: the first priority is less than or equal to the fourth priority threshold;

the priority information includes a second enumerated priority value, and that the first priority corresponds to the priority information includes: the first priority is equal to the second enumerated priority value, where the enumerated value may be a group of discrete values, identifiers, or indexes, that the first priority is equal to the second enumerated priority value means that the first priority is equal to any item in the second enumerated priority value, and for example, if the first priority is a priority 1 and the second enumerated priority value is {priority 1, priority 5, priority 6}, the first priority is equal to the second enumerated priority value; or the priority information includes a second priority range, and that the first priority belongs to the priority information includes: the first priority falls within the second priority range.

Whether the second priority range includes boundary values of the second priority range is not limited in this application, and a plurality of possible combinations such as (A1, B1), (A1, B1], [A1, B1], and [A1, B1] may be included, where "(" indicates that an end value is not included, and "]" indicates that an end value is included.

In this application, the priority information may be not limited to an identifier, an index, or other information used to point to or indicate the priority information. That the priority information is the second priority threshold is used as an example. The second priority threshold may be pointed to by using an identifier, an index, or the second priority threshold itself.

In this case, that the first reliability corresponds to the reliability information includes: the first reliability corresponds to the reliability information and the first priority corresponds to the priority information. The terminal sets the first data field in the buffer status report (BSR) as the first identifier and sets the second data field in the BSR as the second identifier only when the data of the terminal meets constraints of both the reliability information and the priority information. The terminal sends the BSR to the network device, to notify the network device that the terminal has data whose reliability corresponds to the first reliability information and whose priority belongs to the priority information. In this way, the base station learns of the data reliability and the data priority of the sidelink data of the terminal.

Optionally, the setting the first data field in the BSR as the first identifier includes: setting first N1 bits of the first data field in the BSR as the first identifier, and setting last N2 bits of the first data field as the second identifier, where N1 and N2 are positive integers and may be the same or different. In this way, the base station learns of the data reliability and the data priority of the sidelink data of the terminal.

Optionally, the setting the first data field in the BSR as the first identifier includes: setting first M1 bits of the first data field in the BSR as the first identifier, and setting last M2 bits of the first data field as the second identifier, where M1 and M2 are positive integers and may be the same or different. In this way, the base station learns of the data reliability and the data priority of the sidelink data of the terminal.

Optionally, the terminal may alternatively set a second data field in the BSR as a data buffer size of the terminal, so that the base station obtains more information about the sidelink data. Optionally, the data buffer size of the terminal is a data size of sidelink data that is of the terminal and that satisfies both the reliability information and the priority information.

For example, the configuration information includes a correspondence between an LCG ID and reliability information:
{reliability identifier 1}, {reliability identifier 2}, {reliability identifier 3}, and {reliability identifier 4}.

The configuration information further includes a correspondence between an LCG ID and priority information:
{priority identifier 1}, {priority identifier 2}, {priority identifier 3}, and {priority identifier 4}.

The terminal may obtain the following correspondence by obtaining the configuration information:

TABLE 6

| | | | |
|---|---|---|---|
| LCG ID 1 | Priority identifier 1 | LCG ID 1 | Reliability identifier 1 |
| LCG ID 2 | Priority identifier 2 | LCG ID 2 | Reliability identifier 2 |
| LCG ID 3 | Priority identifier 3 | LCG ID 3 | Reliability identifier 3 |
| LCG ID 4 | Priority identifier 4 | LCG ID 4 | Reliability identifier 4 |

For example, in Table 6, any item in the first column may represent a first identifier, and the corresponding second column represents priority information; any item in the third column may represent a second identifier, and the corresponding fourth column may represent reliability information. The sidelink data of the terminal is data 1 and data 2, where the data 1 corresponds to a priority identifier 1, a reliability identifier 2, a destination address 1, and a data size B1, and the data 2 corresponds to a priority identifier 4, a reliability identifier 3, a destination address 2, and a data size B2. If there are sufficient uplink resources available to the terminal, content of the sidelink BSR may be shown as follows:
{destination address 1, LCG ID 1, LCG ID 2, C1}, {destination address 2, LCG ID 4, LCG ID 3, C2}, where C1 is an identifier or an index corresponding to the data size B1, and C2 is an identifier or an index corresponding to the data size B2.

Certainly, it may be understood that the first identifier and the second identifier may be included in one data field, for example, the first data field. For example, a first data field format corresponding to the data 1 may be shown in FIG. 6, where first N1 bits are used to indicate the LCG ID 1, and last N2 bits are used to indicate the LCG ID 2, or vice versa. N1 and N2 may be the same, and both are 4.

Figure 7:
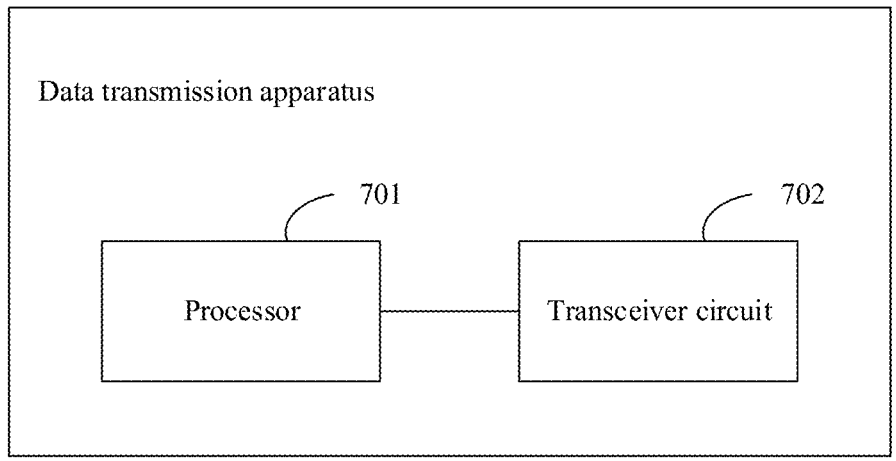
FIG. 7 is a schematic structural diagram of a data transmission apparatus according to this application.

FIG. 7 is a schematic structural diagram of an embodiment of a data transmission apparatus according to this application. The apparatus may be the terminal in the foregoing embodiments, for example, a first terminal, or may be disposed on the terminal, to perform the data transmission method corresponding to FIG. 3.

As shown in FIG. 7, the data transmission apparatus includes a processor 701 and a transceiver circuit 702.

The processor 701 is configured to use the transceiver circuit to: obtain information used to indicate a first condition; obtain to-be-transmitted data; and when the first condition is met, send, over a sidelink, the to-be-transmitted data that is on a first logical channel by using a first carrier frequency and the to-be-transmitted data that is on a second logical channel by using a second carrier frequency.

The information used to indicate the first condition includes one or more of channel congestion information and reliability information.

The first condition includes one or more of a congestion condition and a reliability condition.

Optionally, the first condition may be an activation condition.

The information used to indicate the first condition may be carried in RRC signaling sent by a network device to the terminal, and the RRC signaling may be a SIB message or dedicated RRC signaling. The processor receives the RRC signaling by using the transceiver circuit, to obtain the information used to indicate the first condition.

Alternatively, the information used to indicate the first condition may be carried in a data packet sent by a network device to the terminal device, for example, may be included in a MAC CE. The processor receives the data packet by using the transceiver circuit, to obtain the information used to indicate the first condition.

Alternatively, the information used to indicate the first condition is carried on a PDCCH, and the processor receives the PDCCH by using the transceiver circuit, where the PDCCH includes DCI, and the DCI carries the information used to indicate the first condition.

Alternatively, the information used to indicate the first condition is included in preconfiguration information, and the processor obtains, by using the transceiver circuit, the information used to indicate the first condition.

Optionally, in a possible implementation, the channel congestion information includes a first channel congestion threshold, and the congestion condition includes: a channel congestion degree on a third carrier frequency is greater than or equal to the first channel congestion threshold;
the channel congestion information includes a second channel congestion threshold, and the congestion condition includes: a channel congestion degree on a third carrier frequency is less than or equal to the second channel congestion threshold; or the channel congestion information is a first channel congestion range, and the congestion condition includes: a channel congestion degree on a third carrier frequency falls within the first channel congestion range, where the third carrier frequency is one of carrier frequencies that are configured or preconfigured by the network device and that are used for sidelink communication.

Optionally, in another possible implementation, the reliability information includes a first reliability threshold, and the reliability condition includes: reliability of the to-be-transmitted data is greater than or equal to the first reliability threshold;

the reliability information includes a first enumerated reliability value, and the reliability condition includes: reliability of the to-be-transmitted data is equal to the first enumerated reliability value; or the reliability information includes a first reliability range, and the reliability condition includes: reliability of the to-be-transmitted data falls within the first reliability range.

Optionally, in a possible implementation of this embodiment, the processor 701 is further configured to obtain, by using the transceiver circuit, information used to indicate a carrier frequency set, where the carrier frequency set corresponds to a first data attribute, the carrier frequency set includes the first carrier frequency and the second carrier frequency, and the to-be-transmitted data has the data attribute.

The data attribute includes at least one of the following: a priority, reliability, a delay, a destination address, and a service type. The first data attribute may further include another feature, and this is not specifically limited in this embodiment.

A method for obtaining the information used to indicate the carrier frequency set is similar to a method for obtaining the information used to indicate the first condition, and details are not described herein again.

Optionally, in still another possible implementation of this embodiment, the processor 701 is further configured to obtain a data attribute of each logical channel by using the transceiver circuit.

The processor is further configured to: detect the data attribute of each logical channel, and determine the first logical channel and the second logical channel.

Optionally, in still another possible implementation of this embodiment, the processor 701 is further configured to: obtain, by using the transceiver circuit, a preset correspondence between logical channels used for duplicate data transmission; and determine the first logical channel and the second logical channel when it is detected that the preset correspondence is met.

It may be understood that the "detection" may also be explained as determining, determining, or the like.

Optionally, in still another possible implementation of this embodiment, the processor 701 is further configured to: when a second condition is met, stop sending, over the sidelink, the to-be-transmitted data that is on the first logical channel by using the first carrier frequency and the to-be-transmitted data that is on the second logical channel by using the second carrier frequency.

Further, the information used to indicate the second condition includes any one of a third channel congestion threshold, a fourth channel congestion threshold, and a second channel congestion range.

The second condition includes: a channel congestion degree on a fourth carrier frequency is greater than or equal to the third channel congestion threshold;

a channel congestion degree on a fourth carrier frequency is greater than or equal to the fourth channel congestion threshold; or a channel congestion degree on a fourth carrier frequency falls within the second channel congestion range.

The fourth carrier frequency may be the same as or different from the third carrier frequency.

In addition, the apparatus provided in this embodiment is further configured to: generate a sidelink BSR including identification information, and report the BSR to the network device, to implement the data transmission method shown in FIG. 4. Details are as follows:

The transceiver circuit 702 is configured to obtain configuration information and data, where the configuration information includes reliability information corresponding to a first identifier, or may further include the first identifier.

The processor 701 is configured to: if it is detected that first reliability corresponds to the reliability information, set a first data field in a sidelink buffer status report BSR as the first identifier, and send the BSR to the network device by using the transceiver circuit 702.

The first identifier includes a first logical channel group identity; a first destination address identifier; or a first logical channel group identity and a first destination address identifier.

Optionally, in a possible implementation of this embodiment, the reliability information includes a second reliability threshold, and that the first reliability corresponds to the reliability information includes: the first reliability is greater than or equal to the second reliability threshold;

the reliability information includes a third reliability threshold, and that the first reliability corresponds to the reliability information includes: the first reliability is less than or equal to the third reliability threshold;

the reliability information includes a second enumerated reliability value, and that the first reliability corresponds to the reliability information includes: the first reliability is equal to the second enumerated reliability value; or the reliability information includes a second reliability range, and that the first reliability corresponds to the reliability information includes: the first reliability falls within the second reliability range.

Optionally, in another possible implementation of this embodiment, the configuration information further includes priority information, and a priority corresponding to the data is a first priority.

The processor 701 is specifically configured to: if it is detected that the first reliability corresponds to the reliability information and the first priority corresponds to the priority information, set the first data field in the sidelink buffer status report BSR as the first identifier, and send the BSR to the network device by using the transceiver circuit 702.

Optionally, in still another possible implementation of this embodiment, the priority information includes a first priority threshold, and that the first priority corresponds to the priority information includes: the first priority is greater than or equal to the first priority threshold;

the priority information includes a second priority threshold, and that the first priority corresponds to the priority information includes: the first priority is less than or equal to the second priority threshold;

the priority information includes a first enumerated priority value, and that the first priority corresponds to the priority information includes: the first priority is equal to the first enumerated priority value; or the priority information includes a first priority range, and that the first priority corresponds to the priority information includes: the first priority falls within the first priority range.

Figure 8:
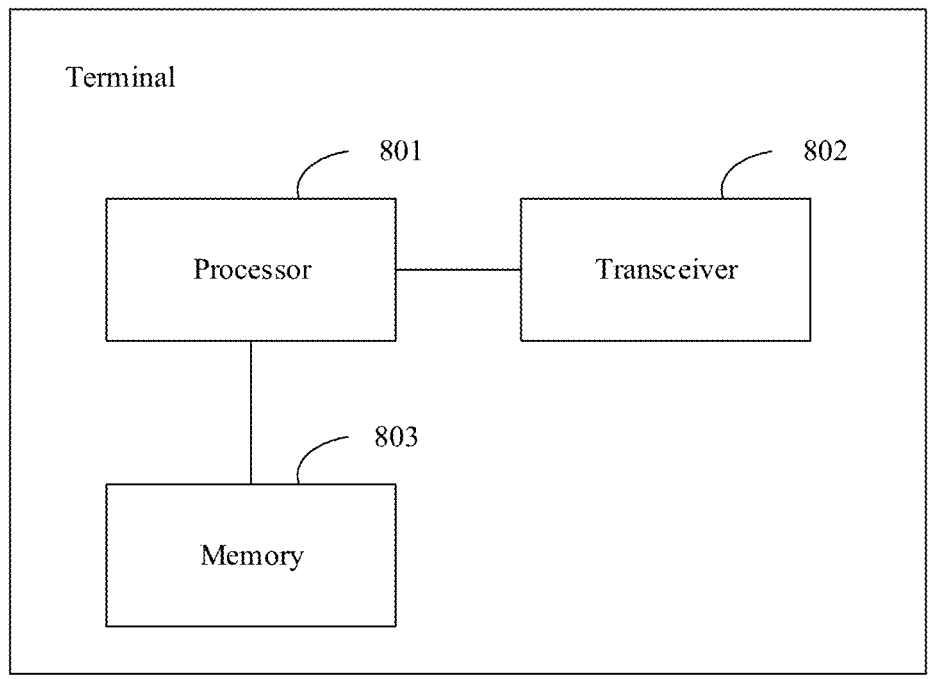
FIG. 8 is a schematic structural diagram of a terminal according to this application.

During specific implementation, this application further provides a terminal. As shown in FIG. 8, the terminal is configured to perform the data transmission method in the foregoing embodiments. The terminal may include a processor 801, a transceiver 802, and a memory 803. The terminal may further include more or fewer components, or combine some components, or have different component arrangements. This is not limited in this application.

The transceiver 802 includes a transceiver circuit. The transceiver circuit may include a receiving unit and a sending unit, configured to implement communication and transmission between terminals and between the terminal and a network device, for example, receiving and sending data, signaling, and request messages.

Further, the transceiver 802 may include communications modules such as a wireless local area network (wireless local area network, WLAN) module, a Bluetooth module, and a baseband (base band) module, and a radio frequency (radio frequency, RF) circuit corresponding to the communications modules, to perform wireless network communication, Bluetooth communication, infrared communication, and/or communication in a cellular communications system, for example, wideband code division multiple access (wideband code division multiple access, WCDMA) and/or high speed downlink packet access (high speed downlink packet access, HSDPA).

The processor 801 is a control center of the terminal, is connected to all parts of the entire terminal device by using various interfaces and lines, and runs or executes a software program and/or a module stored in the memory and invokes data stored in the memory 803, to perform various functions of the terminal and/or process data.

Further, the processor 801 may include an integrated circuit (IC), for example, may include a single packaged IC, or may include a plurality of connected packaged ICs that have a same function or different functions. For example, the processor 801 may include only a central processing unit (CPU), or may be a combination of a GPU, a digital signal processor (DSP), and a control chip (for example, a baseband chip) in a transceiver module. In various implementations of this application, the CPU may be a single computing core, or may include a plurality of computing cores.

The memory 803 may include a volatile memory, for example, a random access memory (RAM); or may include a non-volatile memory), for example, a flash memory, a hard disk drive (HDD), or a solid-state drive (SSD). The memory may alternatively include a combination of the foregoing types of memories. The memory may store a program or code, and the processor 801 of the terminal may implement a function of the network device by executing the program or the code.

In the foregoing embodiment, all functions of the transceiver circuit 702 shown in FIG. 7 may be implemented by the transceiver 802 of the terminal, or may be implemented by the processor 801 controlling the transceiver 802. A function to be implemented by the processor or the processing unit shown in FIG. 7 may be implemented by the processor 801.

The memory 803 is configured to store various information from the network device, for example, information used to indicate a first condition, information used to indicate a carrier frequency set, channel congestion information, reliability information, and information used to indicate a second condition. Further, the information may be carried in RRC signaling. In addition, the memory is further configured to store a first carrier frequency set, a second carrier frequency set, to-be-transmitted data at a PDCP layer, various congestion conditions, various reliability conditions, and the like.

During specific implementation, this application further provides a computer storage medium. The computer storage medium may store a program; when the program is executed, some or all of the steps in the embodiments of the data transmission method provided in this application may be implemented. The storage medium may be a magnetic disk, an optical disc, a ROM, a RAM, or the like.

Corresponding to the foregoing embodiment of the terminal, this application further provides a network device, configured to implement a data transmission method corresponding to behavior of the terminal. Specifically, the network device includes a processor, a transceiver, and a memory, or a structure of the network device is the same as a structure of the terminal. Details are as follows:

The network device generates information indicating a first condition, where the information about the first condition includes an activation condition used to activate duplicate transmission at a PDCP layer, or includes information such as a necessary parameter used to indicate the activation condition.

The network device sends the information about the first condition.

Optionally, the information used to indicate the first condition includes a first channel congestion threshold, a second channel congestion threshold, or a first channel congestion range. The first condition includes a congestion condition. Further, the congestion condition includes: a channel congestion degree on a third carrier frequency of a terminal is greater than or equal to the first channel congestion threshold; a channel congestion degree on a third carrier frequency of a terminal is less than or equal to the second channel congestion threshold; or a channel congestion degree on a third carrier frequency of a terminal falls within the first channel congestion range.

Optionally, the information used to indicate the first condition may include a first reliability threshold, a first enumerated reliability value, or a first reliability range, and the first condition includes a reliability condition. Further, the reliability condition includes: reliability of the to-be-transmitted data is greater than or equal to the first reliability threshold; the reliability condition includes: reliability of the to-be-transmitted data is equal to the first enumerated reliability value; or the reliability condition includes: reliability of the to-be-transmitted data falls within the first reliability range.

The network device generates information for indicate a second condition, and sends the information indicating the second condition.

The information used to indicate the second condition includes any one of a third channel congestion threshold, a fourth channel congestion threshold, and a second channel congestion range. The second condition includes: a channel congestion degree on a fourth carrier frequency is greater than or equal to the third channel congestion threshold; a channel congestion degree on a fourth carrier frequency is less than or equal to the fourth channel congestion threshold; or a channel congestion degree on a fourth carrier frequency falls within the second channel congestion range.

Optionally, the network device further sends RRC signaling, where the RRC signaling includes information used to indicate the third carrier frequency.

Optionally, the RRC signaling includes information used to indicate a first carrier frequency set and a second carrier frequency set.

Optionally, the RRC signaling includes information used to indicate a third carrier frequency set.

Optionally, the RRC signaling includes information used to indicate a fourth carrier frequency set, the fourth carrier frequency set corresponds to a first data attribute, and the fourth carrier frequency set includes the first carrier frequency and the second carrier frequency. The data attribute includes one or more of a priority, reliability, a delay, a destination address, and a service type.

In addition, in this embodiment, the network device is further configured to send configuration information to the terminal to obtain a sidelink status of the terminal, to better schedule a resource for the terminal. The network device is configured to:

send, by the network device, configuration information to the terminal, wherein the configuration information includes reliability information corresponding to the first identifier, wherein the configuration information is used to configure the terminal to set a first data field in a sidelink buffer status report BSR as the first identifier if reliability of data of the terminal corresponds to the reliability information; and receive, by the network device, the sidelink BSR from the terminal.

Optionally, the configuration information further includes priority information, where the configuration information is used to configure the terminal to send the sidelink BSR if the reliability of the data of the terminal corresponds to the reliability information and a priority of the data corresponds to the priority information, where the first data field in the sidelink BSR is the first identifier.

Optionally, the first identifier includes a first logical channel group identity; a first destination address identifier; or a first logical channel group identity and a first destination address identifier.

During specific implementation, a processor of the network device executes the foregoing data transmission method by reading an instruction in a memory. The memory is coupled to the processor, and the memory includes a storage medium, for example, a magnetic disk, an optical disc, a ROM, or a RAM.

The terminal in this application is used in a scenario of sidelink technologies, that is, is applicable to device-to-device (D2D) data transmission. The terminal may be a transmit device at one end, or may be a receive device at the other end.

In addition, this application further provides a communications system, used to transmit a duplicate data packet on a sidelink. The system includes at least two terminals, and each terminal may be the data transmission apparatus shown in FIG. 7, or includes the terminal structure shown in FIG. 8, to implement the data transmission method in Embodiment 1 of this application.

Specifically, the data transmission method includes the following steps:

determining, by a first terminal, at least one first carrier frequency and at least one second carrier frequency, where the first carrier frequency and the second carrier frequency are different; and sending, by the first terminal over a sidelink, data on a first logical channel and data on a second logical channel to a second terminal respectively by using the at least one first carrier frequency and the at least one second carrier frequency, where the first logical channel and the second logical channel both include first data, and the first data is from a same PDCP entity.

Optionally, the determining, by a first terminal, at least one first carrier frequency and at least one second carrier frequency includes: autonomously determining, by the first terminal, the at least one first carrier frequency and the at least one second carrier frequency; or determining the at least one first carrier frequency and the at least one second carrier frequency through pre-configuration by a network device.

Optionally, the method further includes: obtaining, by the first terminal, a correspondence between a carrier frequency set and an identifier, where the identifier includes at least one of the following: a priority, a destination address, reliability, a delay, and a service type.

The determining, by a first terminal, at least one first carrier frequency and at least one second carrier frequency further includes: determining, by the first terminal, the at least one first carrier frequency and the at least one second carrier frequency based on a first identifier corresponding to the first data and the correspondence, where the at least one first carrier frequency and the at least one second carrier frequency belong to the carrier frequency set.

In addition, the first identifier corresponding to the first data includes at least one of a priority corresponding to the first data, a destination address corresponding to the first data, reliability corresponding to the first data, a delay corresponding to the first data, a service type corresponding to the first data, and the like.

Optionally, before the sending, by the first terminal over a sidelink, data on a first logical channel and data on a second logical channel to a second terminal respectively by using the at least one first carrier frequency and the at least one second carrier frequency, the method further includes: determining, by the first terminal, whether a first condition is met; and if the first condition is met, separately delivering the first data to the first logical channel and the second logical channel.

Optionally, the method further includes: obtaining, by the first terminal, first channel congestion information.

If the first channel congestion information is a first channel congestion threshold, the first condition includes: a channel congestion degree on a third carrier frequency is greater than or equal to the first channel congestion threshold;

if the first channel congestion information is a second channel congestion threshold, the first condition includes: a channel congestion degree on a third carrier frequency is less than or equal to the second channel congestion threshold; or if the first channel congestion information is a first channel congestion range, the first condition includes: a channel congestion degree on a third carrier frequency falls within the first channel congestion range.

Optionally, the method further includes: obtaining, by the first terminal, reliability information.

If the reliability information includes a first reliability threshold, the first condition includes: data reliability information corresponding to the first data is greater than or equal to the first reliability threshold;

if the reliability information includes a second reliability threshold, the first condition includes: data reliability information corresponding to the first data is equal to the second reliability threshold, where the second reliability threshold is one or more enumerated reliability values; or if the reliability information includes a first reliability range, the first condition includes: data reliability information corresponding to the first data falls within the first reliability range.

Optionally, the method further includes:

Specifically, when a second condition is met, the first terminal device determines to stop delivering the same first data to the first logical channel and the second logical channel.

Optionally, the method further includes: obtaining, by the first terminal, second channel congestion information.

If the second channel congestion information includes a third channel congestion threshold and a fourth channel congestion threshold, the second condition includes: a channel congestion degree on the at least one first carrier frequency corresponding to the first logical channel is greater than or equal to the third channel congestion threshold, and a channel congestion degree on the at least one second carrier frequency corresponding to the second logical channel is greater than or equal to the fourth channel congestion threshold; or if the second channel congestion information includes a fifth channel congestion threshold and a sixth channel congestion threshold, the second condition includes: a channel congestion degree on the at least one first carrier frequency corresponding to the first logical channel is less than or equal to the fifth channel congestion threshold, and a channel congestion degree on the at least one second carrier frequency corresponding to the second logical channel is less than or equal to the sixth channel congestion threshold.

The channel congestion degree on the at least one first carrier frequency corresponding to the first logical channel is a maximum value of a channel congestion degree corresponding to the at least one first carrier frequency, or a minimum value of a channel congestion degree corresponding to the at least one first carrier frequency.

The channel congestion degree on the at least one second carrier frequency corresponding to the second logical channel is a maximum value of a channel congestion degree corresponding to the at least one second carrier frequency, or a minimum value of a channel congestion degree corresponding to the at least one second carrier frequency.

It should be noted that in this application, the first channel congestion threshold, the second channel congestion threshold, the third channel congestion threshold, the fourth channel congestion threshold, the fifth channel congestion threshold, and the sixth channel congestion threshold may be the same or different, the first channel congestion range and the second channel congestion range may be the same or different, and the first reliability threshold and the second reliability threshold may be the same or different. These are not limited in this application.

Optionally, before the determining, by a first terminal, at least one first carrier frequency and at least one second carrier frequency, the method further includes:

determining, by a MAC layer of the terminal, the first logical channel and the second logical channel that are used for duplicate transmission.

Optionally, the determining, by a MAC layer of the terminal, the first logical channel and the second logical channel specifically includes:

determining, by the MAC layer, the first logical channel and the second logical channel based on identification information of logical channels, where the identification information may include at least one of the following: a priority, reliability, a delay, a destination address, and a service type.

Alternatively, if there is a pairing relationship between the first logical channel and the second logical channel, the MAC layer may determine the first logical channel and the second logical channel based on logical channels that have the pairing relationship.

For detailed descriptions of various implementations of the method, refer to the descriptions of the method in the foregoing embodiments. Details are not described herein again.

A person skilled in the art may clearly understand that, the technologies in the embodiments of this application may be implemented by software in combination with a necessary general hardware platform. Based on such an understanding, the technical solutions in the embodiments of this application essentially or the part contributing to the prior art may be implemented in a form of a software product. The computer software product may be stored in a storage medium, such as a ROM/RAM, a magnetic disk, an optical disc, or the like, and include several instructions for enabling a computer device (which may be a personal computer, a server, a network device, or the like) to perform the methods described in the embodiments or some parts of the embodiments of this application.

For same or similar parts in the embodiments in this specification, refer to each other. Especially, the foregoing embodiments in this application are basically similar to the method embodiments, and therefore are described briefly. For related parts, refer to the descriptions in the method embodiments.

The foregoing implementations of this application are not intended to limit the protection scope of this application.

What is claimed is:

1. A data transmission method performed by a terminal, the method comprising:

obtaining reliability information associated with a first identifier and priority information,
wherein the reliability information comprises a reliability value set,
wherein the reliability value set is a group of discrete values, and
wherein the priority information comprises a priority value set;

obtaining a reliability value and a priority value of first data of the terminal; and sending a sidelink buffer status report (BSR) to a network device in response to both the reliability value being a value from the reliability value set and the priority value being a value from the priority value set, wherein the first identifier is included in the sidelink BSR.

2. The method according to claim 1, wherein the first identifier comprises one of the following (a)-(c):

(a) a first logical channel group identity;
(b) a first destination address identifier; or
(c) a first logical channel group identity and a first destination address identifier.

3. The method according to claim 1, wherein one of the following situations exists:

the reliability information comprises a second reliability threshold, and the reliability value is greater than or equal to the second reliability threshold;

the reliability information comprises a third reliability threshold, and the reliability value is less than or equal to the third reliability threshold;

the reliability information comprises a second enumerated reliability value, and the reliability value is equal to the second enumerated reliability value; or the reliability information comprises a second reliability range, and the reliability value falls within the second reliability range.

4. A data transmission method applied to a network device, the method comprising:
sending, to a terminal, reliability information and priority information associated with at least one logical channel group (LCG) ID,
wherein the reliability information comprises a reliability value set,
wherein the reliability value set is a group of discrete values,
wherein the priority information comprises a priority value set, and
wherein at least one reliability value of the group of discrete values and a priority value of the priority value set are identified as describing a first LCG ID of the at least one LCG ID; and
receiving a sidelink buffer status report (BSR), including the first LCG ID, from the terminal.

5. The method according to claim 4, wherein one of the following situations exists:
the reliability information comprises a second reliability threshold, and the at least one reliability value of the group of discrete values is greater than or equal to the second reliability threshold;
the reliability information comprises a third reliability threshold, and the at least one reliability value of the group of discrete values is less than or equal to the third reliability threshold;
the reliability information comprises a second enumerated reliability value, and the at least one reliability value of the group of discrete values is equal to the second enumerated reliability value; or
the reliability information comprises a second reliability range, and the at least one reliability value of the group of discrete values falls within the second reliability range.

6. An apparatus comprising:
a processor and a non-transitory storage medium storing executable instructions that when executed by the processor, cause the apparatus to:
obtain reliability information associated with a first identifier and priority information,
wherein the reliability information comprises a reliability value set,
wherein the reliability value set is a group of discrete values, and
wherein the priority information comprises a priority value set;
obtain a reliability value and a priority value of first data of the terminal; and
send a sidelink buffer status report (BSR) to a network device in response to the reliability value being a value from the reliability value set and the priority value being a value from the priority value set,
wherein the first identifier is included in the sidelink BSR.

7. The apparatus according to claim 6, wherein the first identifier comprises one of the following (a)-(c):
(a) a first logical channel group identity;
(b) a first destination address identifier; or
(c) a first logical channel group identity and a first destination address identifier.

8. The apparatus according to claim 6, wherein one of the following situations exists:
the reliability information comprises a second reliability threshold, and the reliability value is greater than or equal to the second reliability threshold;
the reliability information comprises a third reliability threshold, and the reliability value is less than or equal to the third reliability threshold;
the reliability information comprises a second enumerated reliability value, and the reliability value is equal to the second enumerated reliability value; or
the reliability information comprises a second reliability range, and the reliability value falls within the second reliability range.

9. An apparatus comprising:
a processor and a non-transitory storage medium storing executable instructions that when executed by the processor, cause the apparatus to:
send, to a terminal, reliability information and priority information associated with at least one logical channel group (LCG) ID,
wherein the reliability information comprises a reliability value set,
wherein the reliability value set is a group of discrete values,
wherein the priority information comprises a priority value set, and
wherein at least one reliability value of the group of discrete values and a priority value of the priority value set are identified as describing a first LCG ID of the at least one LCG ID; and
receive a sidelink buffer status report (BSR), including the first LCG ID, from the terminal.

10. The apparatus according to claim 9, wherein one of the following situations exists:
the reliability information comprises a second reliability threshold, and the at least one reliability value of the group of discrete values is greater than or equal to the second reliability threshold;
the reliability information comprises a third reliability threshold, and the at least one reliability value of the group of discrete values is less than or equal to the third reliability threshold;
the reliability information comprises a second enumerated reliability value, and the at least one reliability value of the group of discrete values is equal to the second enumerated reliability value; or
the reliability information comprises a second reliability range, and the at least one reliability value of the group of discrete values falls within the second reliability range.

* * * * *